United States Patent
Tanimoto et al.

(10) Patent No.: US 11,935,012 B2
(45) Date of Patent: Mar. 19, 2024

(54) CONSTRUCT INFORMATION MANAGEMENT SYSTEM AND METHOD

(71) Applicant: HITACHI, LTD., Tokyo (JP)

(72) Inventors: Kouichi Tanimoto, Tokyo (JP); Satoru Hori, Tokyo (JP); Hirofumi Inomata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 356 days.

(21) Appl. No.: 16/977,730

(22) PCT Filed: Aug. 20, 2018

(86) PCT No.: PCT/JP2018/030610
§ 371 (c)(1),
(2) Date: Sep. 2, 2020

(87) PCT Pub. No.: WO2019/171617
PCT Pub. Date: Sep. 12, 2019

(65) Prior Publication Data
US 2021/0065139 A1 Mar. 4, 2021

(30) Foreign Application Priority Data
Mar. 5, 2018 (JP) ................. 2018-038931

(51) Int. Cl.
*G06Q 10/20* (2023.01)
*G06F 3/0482* (2013.01)
(Continued)

(52) U.S. Cl.
CPC .......... *G06Q 10/20* (2013.01); *G06F 16/288* (2019.01); *G06Q 10/06315* (2013.01);
(Continued)

(58) Field of Classification Search
CPC .................. G06Q 10/20; G06Q 10/06315
See application file for complete search history.

(56) References Cited

U.S. PATENT DOCUMENTS

| | | | |
|---|---|---|---|
| 9,014,415 B2* | 4/2015 | Chen | G06T 7/0002 382/100 |
| 2005/0268245 A1* | 12/2005 | Gipps | G06F 30/13 715/762 |

(Continued)

FOREIGN PATENT DOCUMENTS

| JP | 2005-031824 A | 2/2005 |
|---|---|---|
| JP | 2007-004497 A | 1/2007 |

(Continued)

OTHER PUBLICATIONS

Pradhananga et al, Automatic spatio-temporal analysis of construction site equipment operations using GPS data, Automation in Construction 29 (2013) 107-122 (Year: 2013).*

(Continued)

*Primary Examiner* — Andre D Boyce
(74) *Attorney, Agent, or Firm* — Volpe Koenig

(57) ABSTRACT

A construct information management system and method for enabling handling of different types of data is provided.

A construct information management system 1 for managing information related to a construct includes: a data collection unit 11 configured to collect different types of source data related to different types of constructs from prescribed data sources 2A, 2B, 3A, 3B and retain the collected source data; and a data management unit 12 configured to map the collected source data onto a prescribed spatiotemporal model, acquire prescribed data associated with input data on the basis of at least mapping information on the prescribed spatiotemporal model, and process and output the acquired prescribed data.

12 Claims, 25 Drawing Sheets

(51) Int. Cl.
*G06F 16/28* (2019.01)
*G06Q 10/0631* (2023.01)
*G06Q 10/0635* (2023.01)
*G06Q 10/0637* (2023.01)
*G06Q 50/16* (2012.01)
*G06Q 50/26* (2012.01)
*H04L 9/40* (2022.01)

(52) U.S. Cl.
CPC ..... *G06Q 10/06375* (2013.01); *G06Q 50/163* (2013.01); *G06Q 50/26* (2013.01); *H04L 63/08* (2013.01); *G06F 3/0482* (2013.01); *G06Q 10/0635* (2013.01)

(56) References Cited

U.S. PATENT DOCUMENTS

| | | | |
|---|---|---|---|
| 2006/0020430 A1* | 1/2006 | Gipps | G06Q 10/047 703/1 |
| 2006/0020431 A1* | 1/2006 | Gipps | G06Q 10/047 703/1 |
| 2006/0020789 A1* | 1/2006 | Gipps | H04L 9/14 713/167 |
| 2006/0206623 A1* | 9/2006 | Gipps | G06Q 10/04 709/238 |
| 2007/0219654 A1 | 9/2007 | Frink et al. | |
| 2009/0132316 A1* | 5/2009 | Florance | G06Q 30/06 715/810 |
| 2013/0216089 A1* | 8/2013 | Chen | G06T 7/0002 382/100 |
| 2014/0035726 A1* | 2/2014 | Schoner | H04W 64/00 340/8.1 |
| 2014/0100815 A1* | 4/2014 | Dubuc | G01B 21/04 702/152 |
| 2014/0267627 A1 | 9/2014 | Freeman et al. | |
| 2015/0019267 A1 | 1/2015 | Prieto et al. | |
| 2016/0071059 A1* | 3/2016 | Petering | G06Q 10/103 705/301 |
| 2017/0076563 A1* | 3/2017 | Guerriero | F17D 5/06 |
| 2017/0314803 A1 | 11/2017 | Jacobson et al. | |

FOREIGN PATENT DOCUMENTS

| | | |
|---|---|---|
| JP | 2010-079478 A | 4/2010 |
| JP | 2012-194620 A | 10/2012 |
| WO | 2016/094297 A1 | 6/2016 |

OTHER PUBLICATIONS

International Search Report and English Translation, PCT/JP2018/030610, dated Oct. 9, 2018, 4 pages.
Extended European Search Report dated Dec. 10, 2021 for European Patent Application No. 18908400.7.
Communication pursuant to Article 94(3) EPC dated Oct. 27, 2023 for European Patent Application No. 18908400.7.
McGuire, M., "Characterizing Sensor Datasets with Multi-Granular Spatio-Temporal Intervals" Article, Association for Computing Machinery, New York, NY, (2011).
Hattori, S., "Granularity Analysis for Spatio-Temporal Web Sensors" Abstract, World Academy of Science, Engineering and Technology, (2013).

* cited by examiner

[FIG. 1]
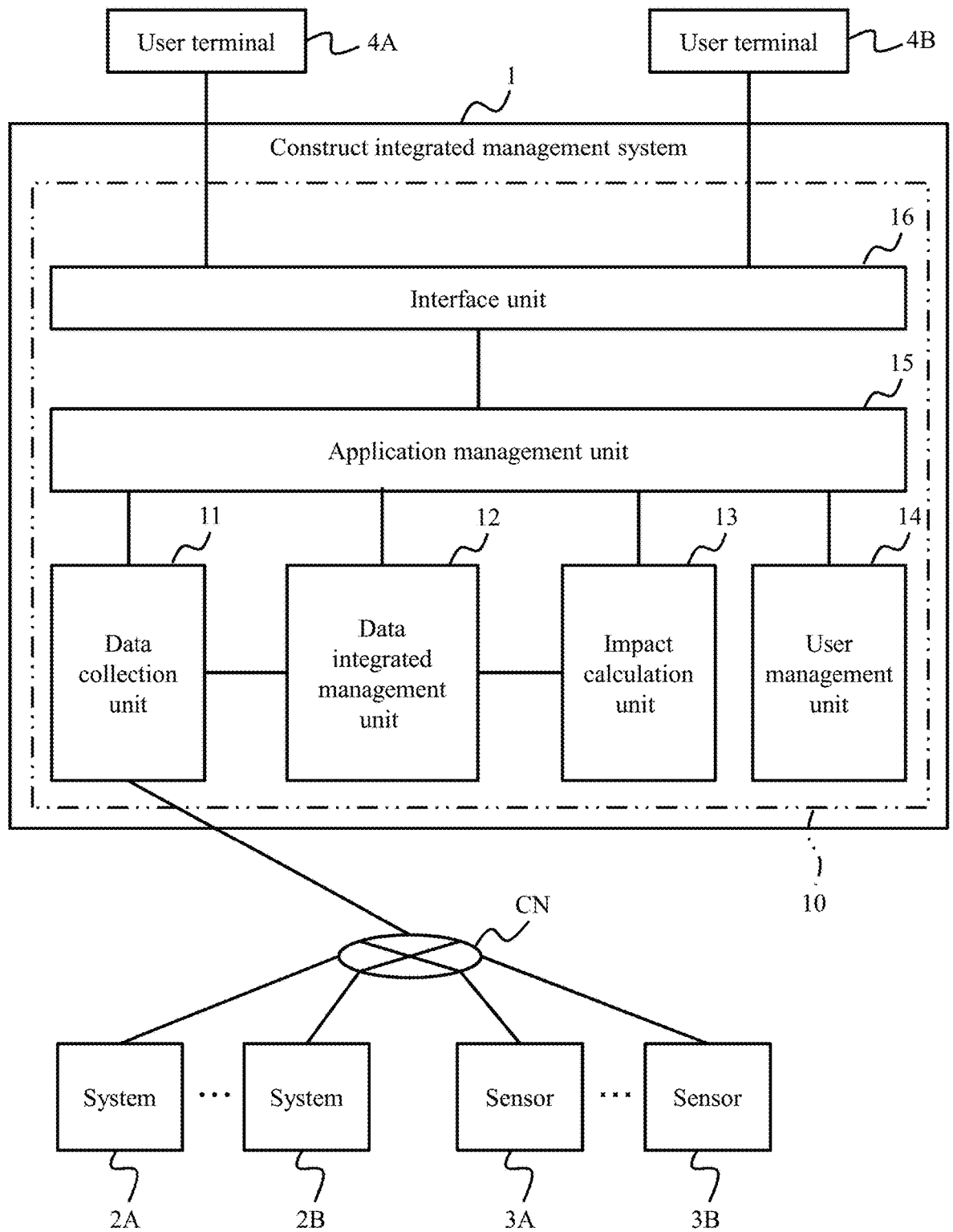

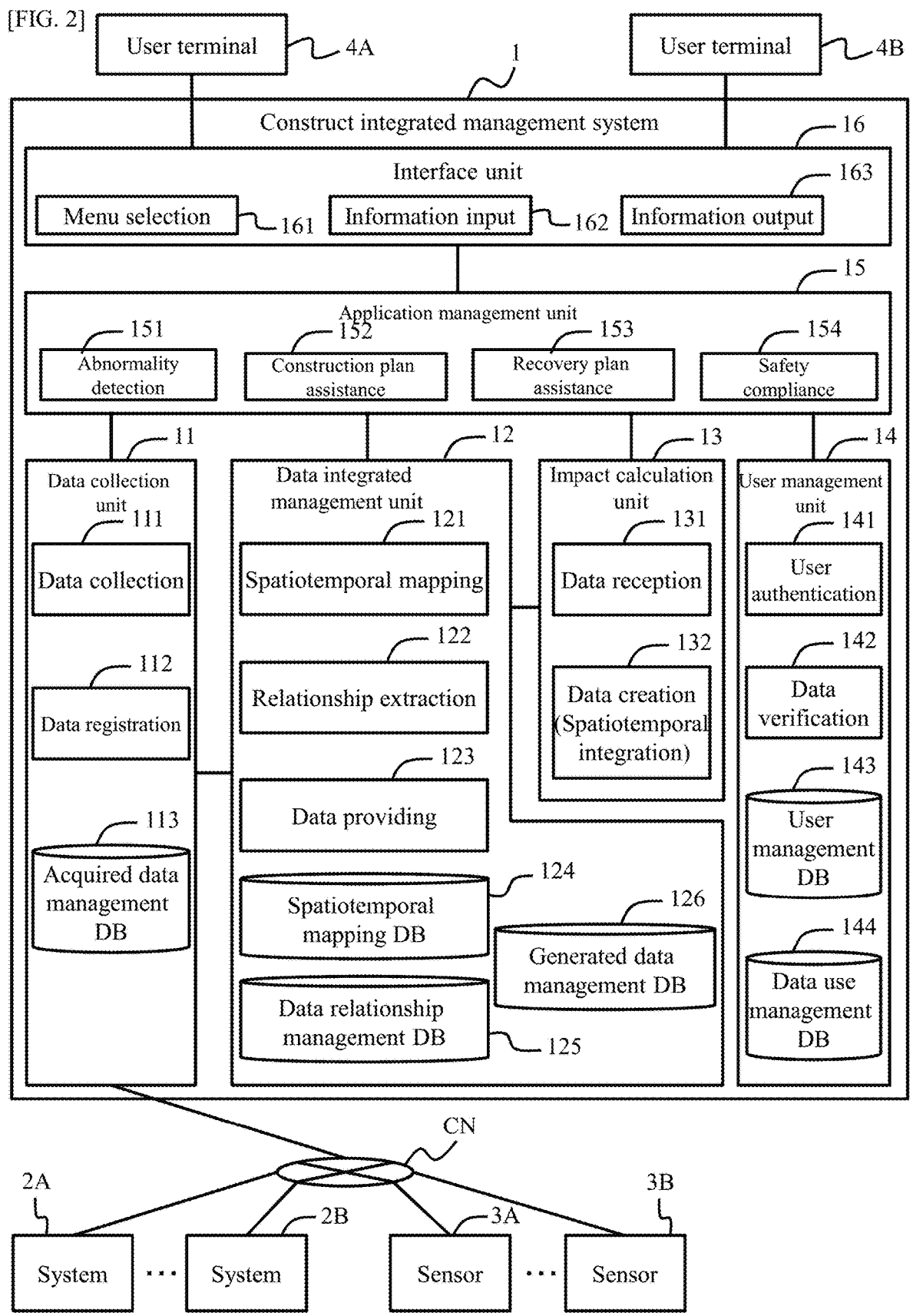

[FIG. 3]
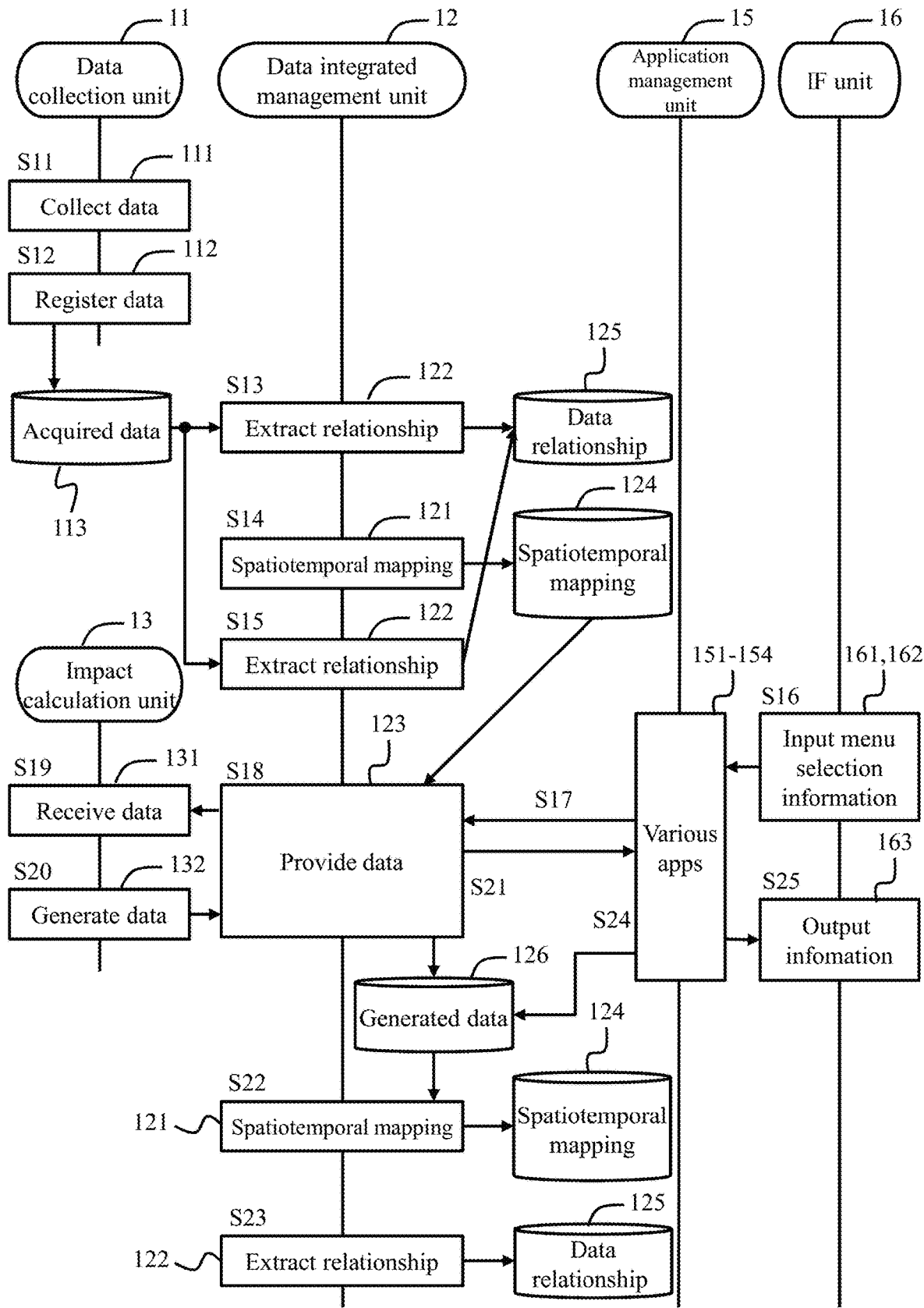

[FIG. 4]
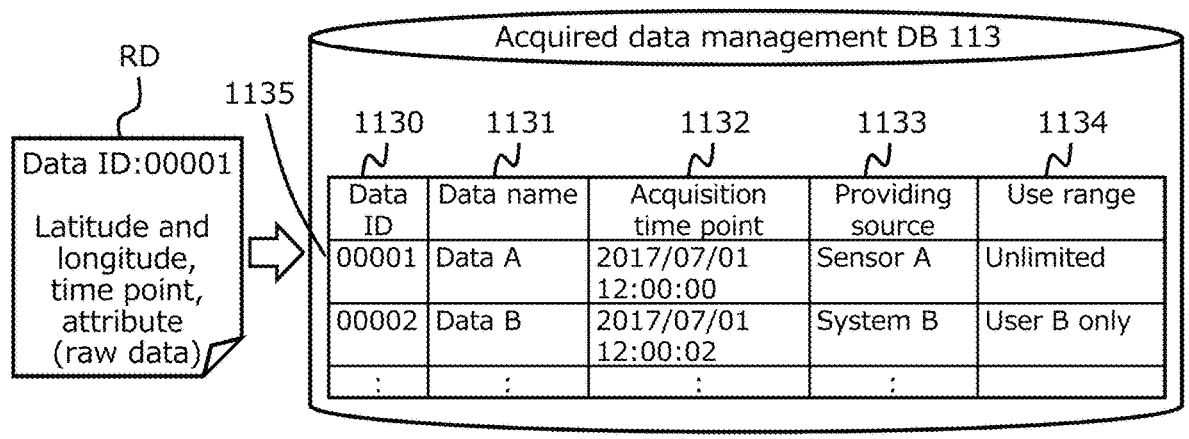

[FIG. 5]
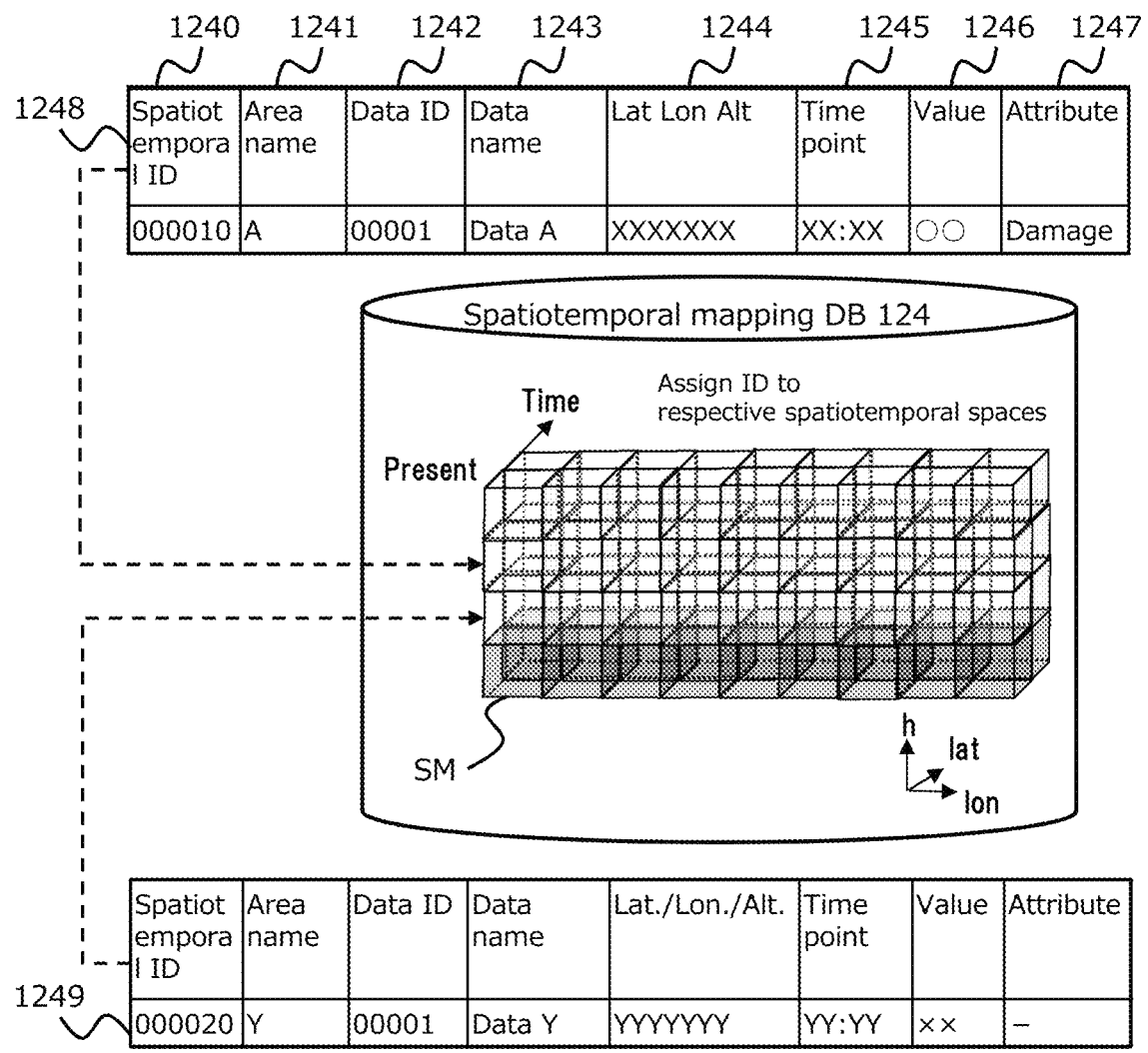

[FIG. 6]
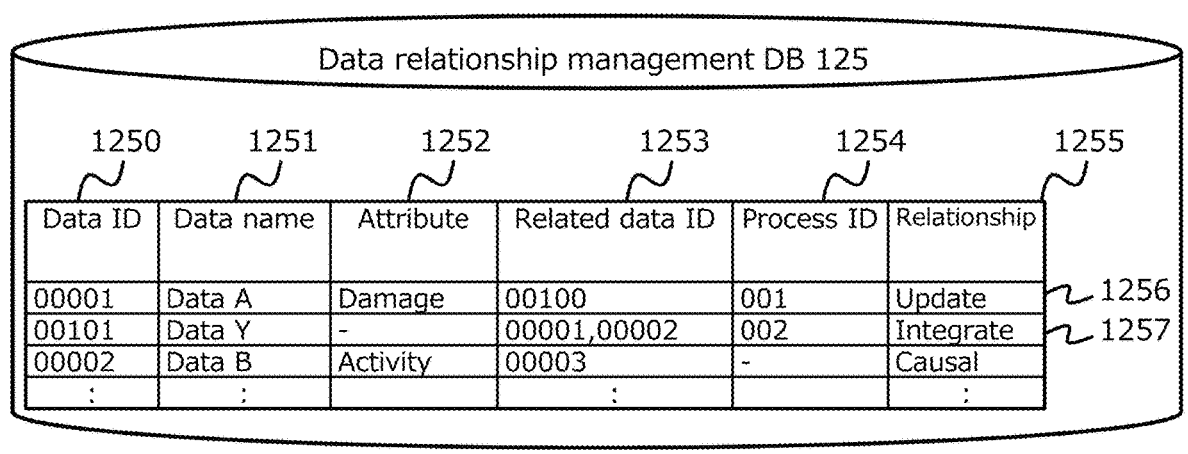

[FIG. 7]
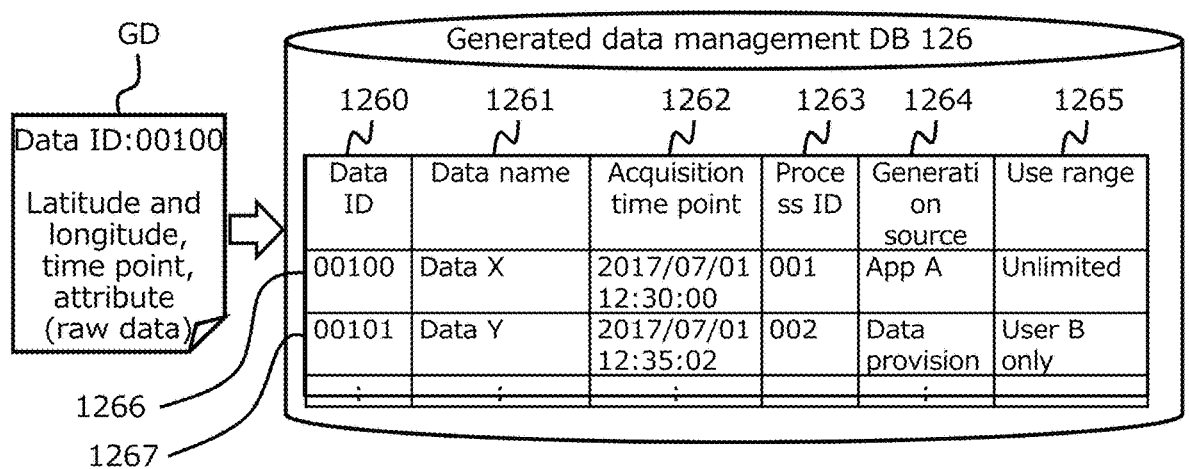

[FIG. 8]
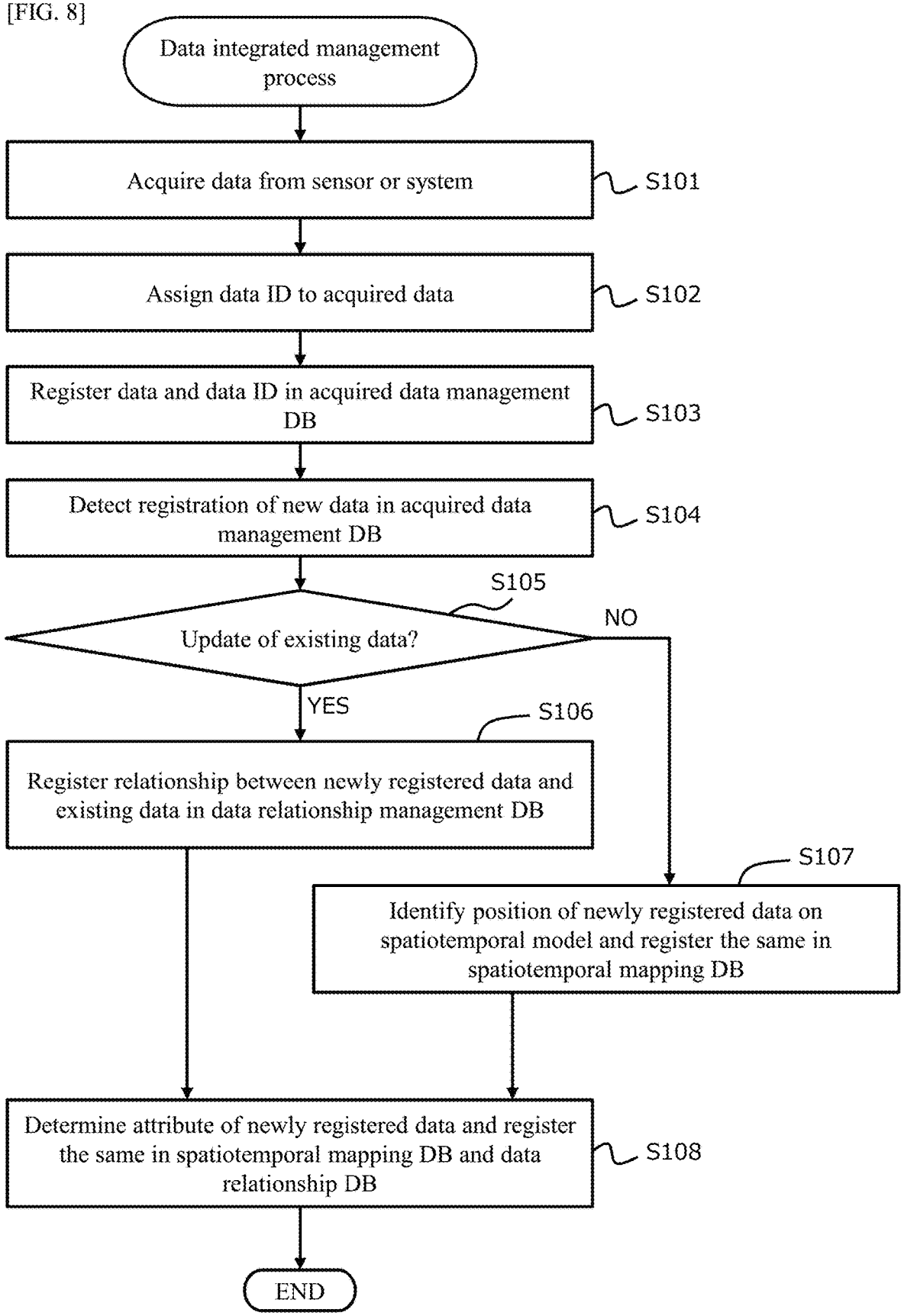

[FIG. 9]
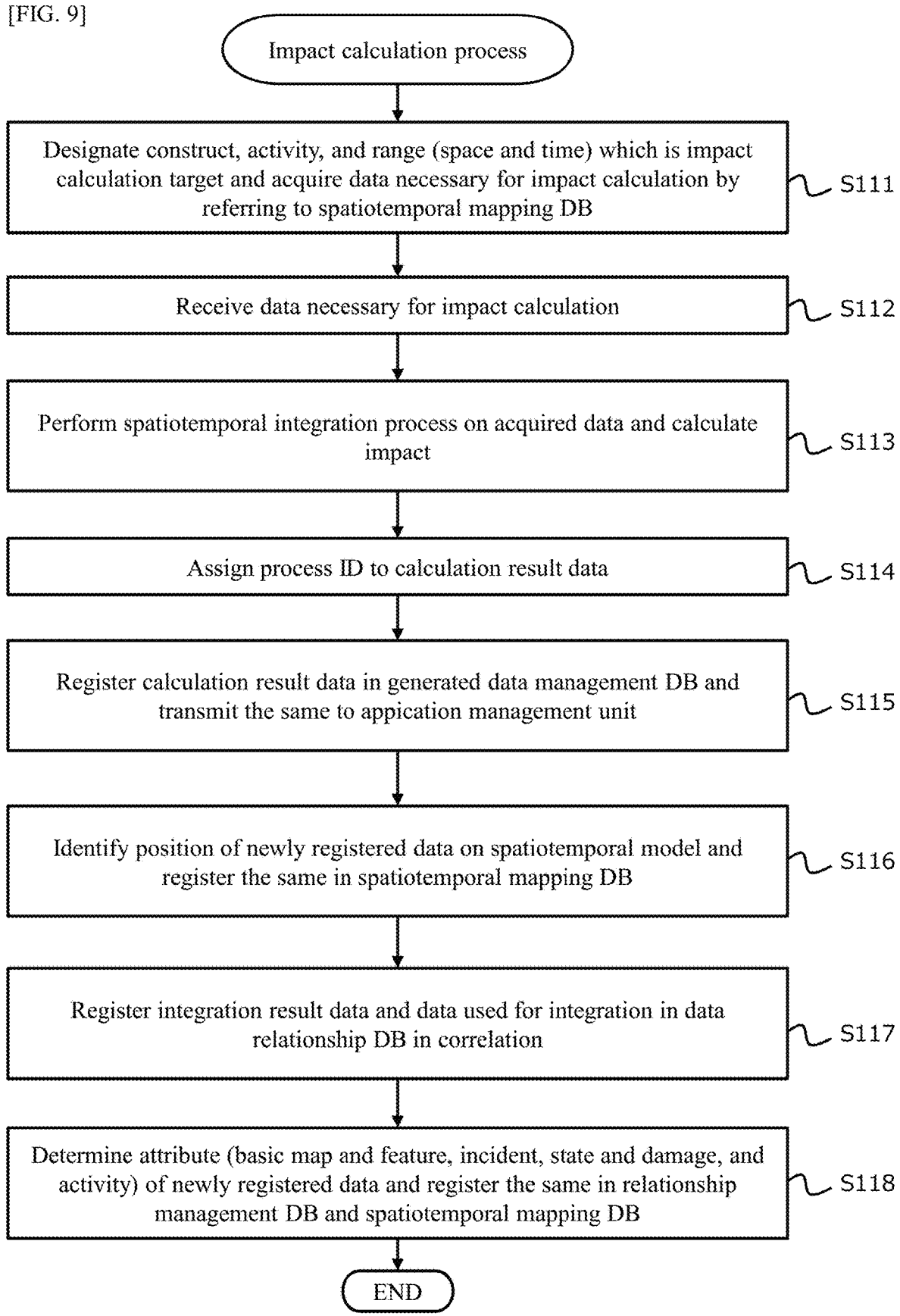

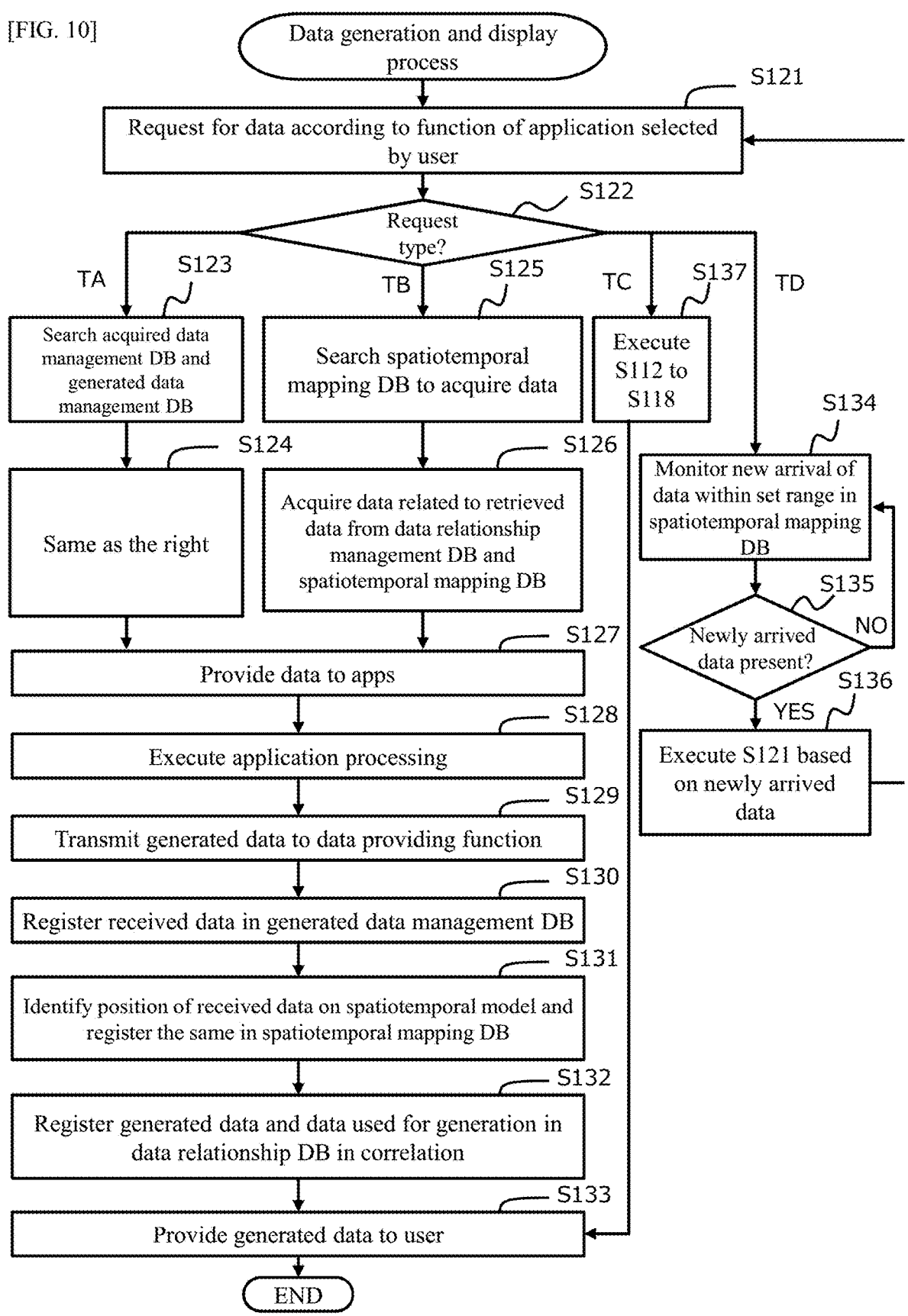
[FIG. 10]

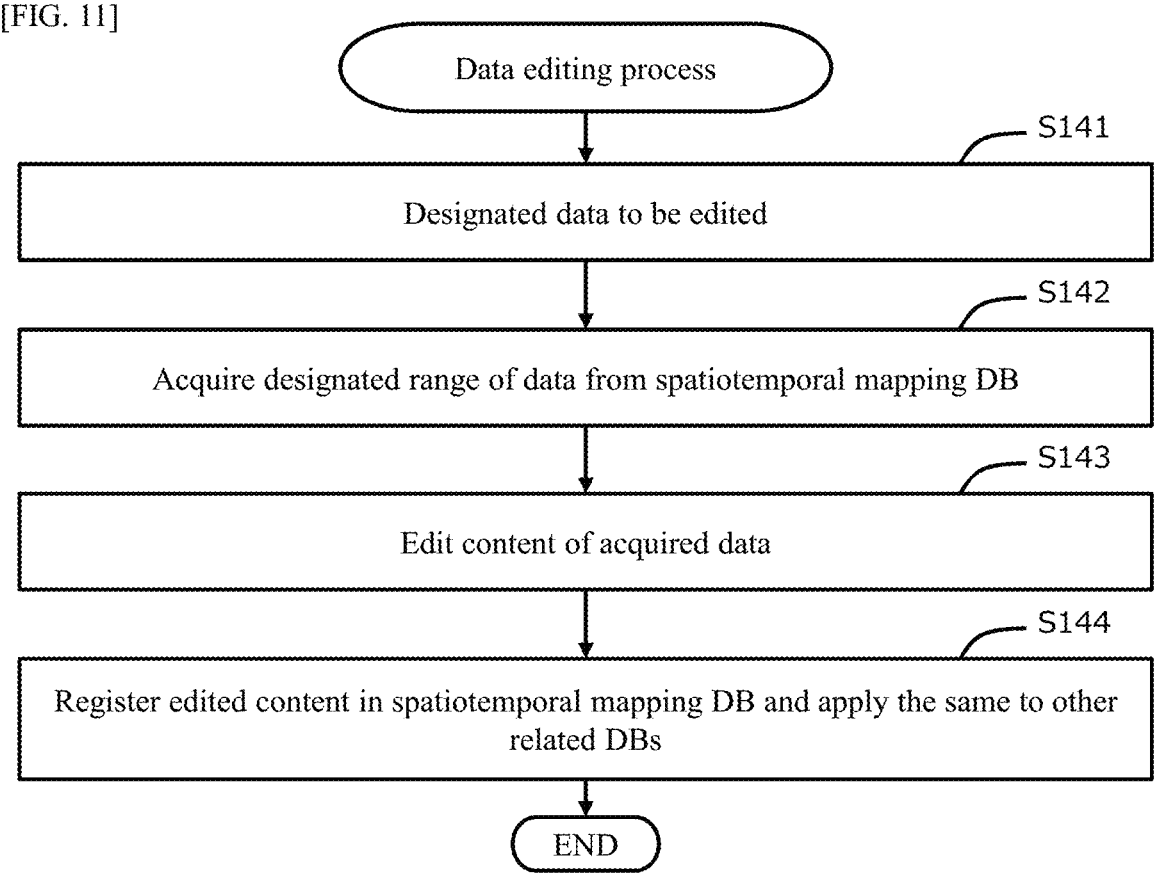

[FIG. 12]
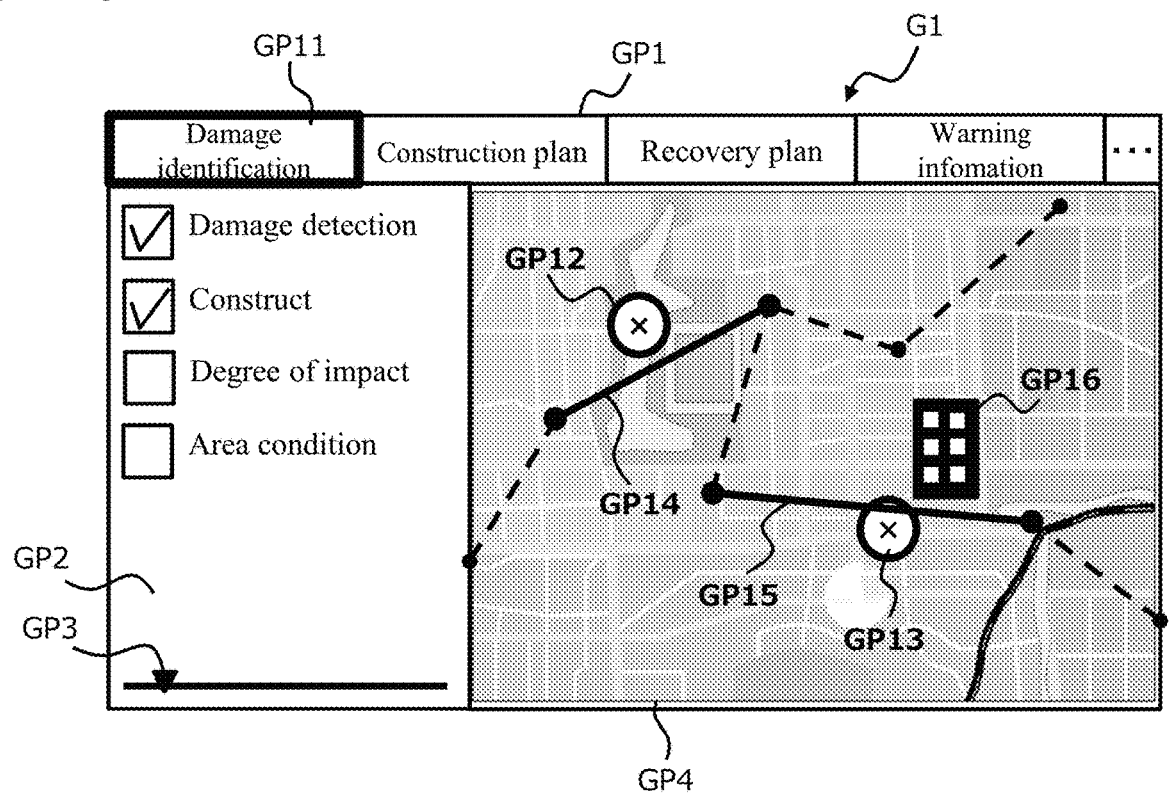

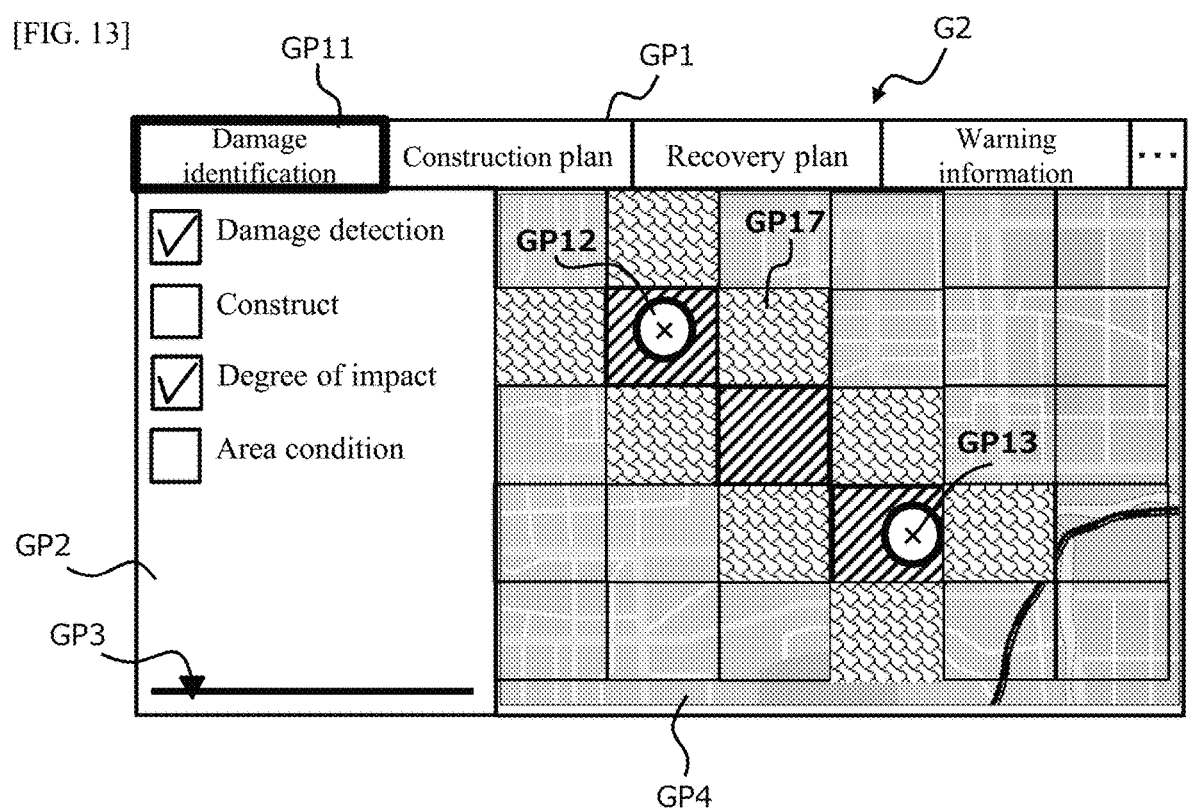
[FIG. 13]

[FIG. 14]
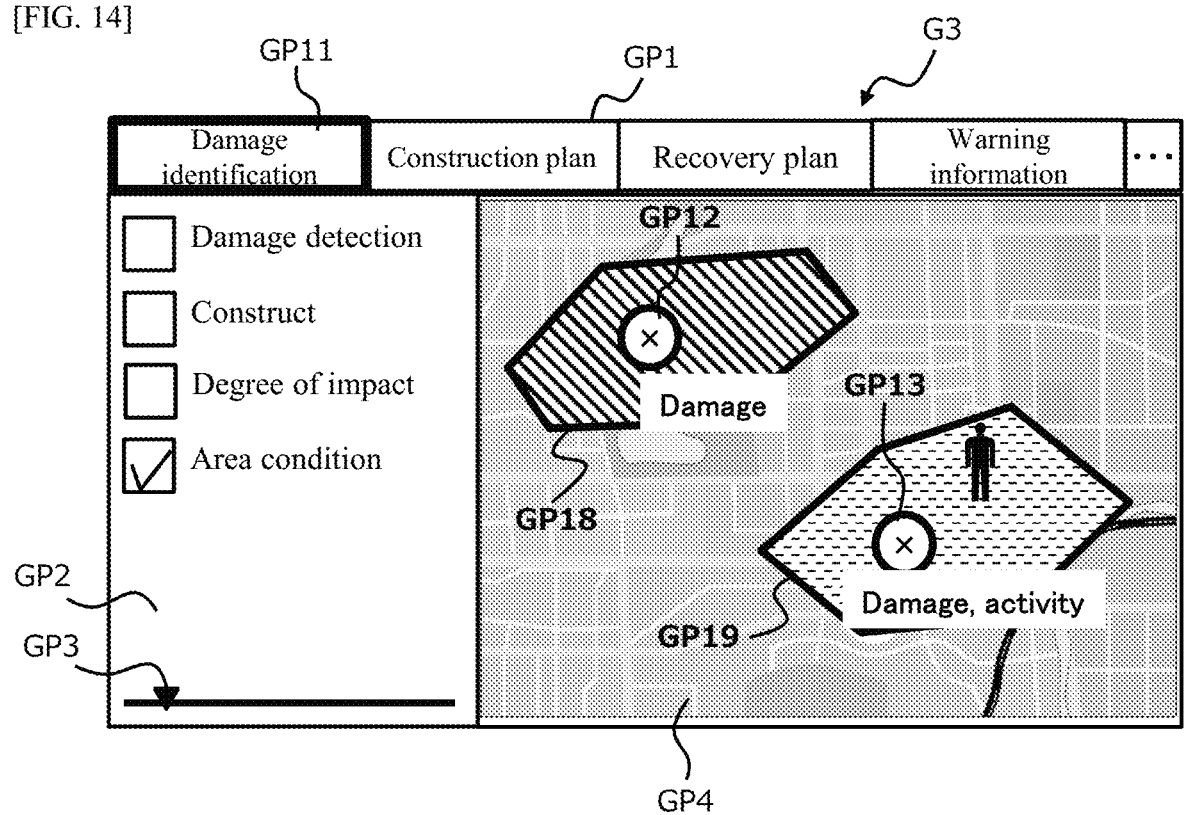

[FIG. 15]
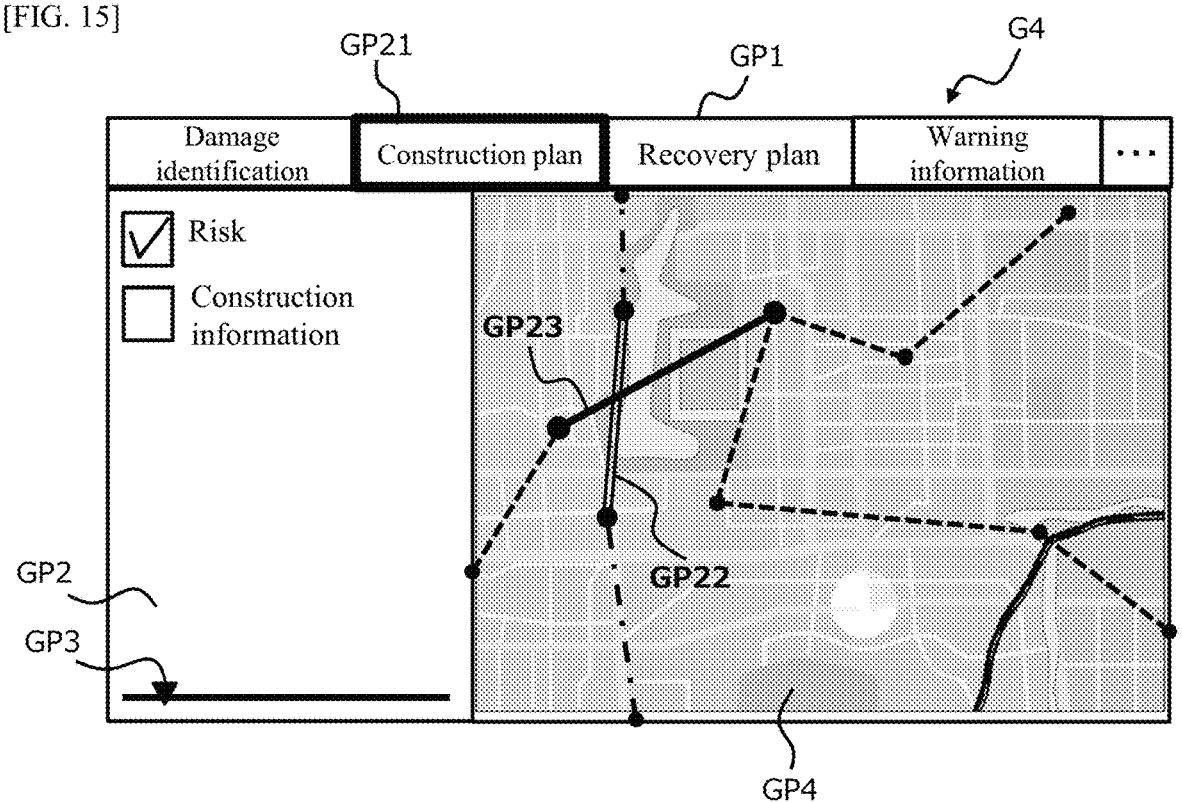

[FIG. 16]
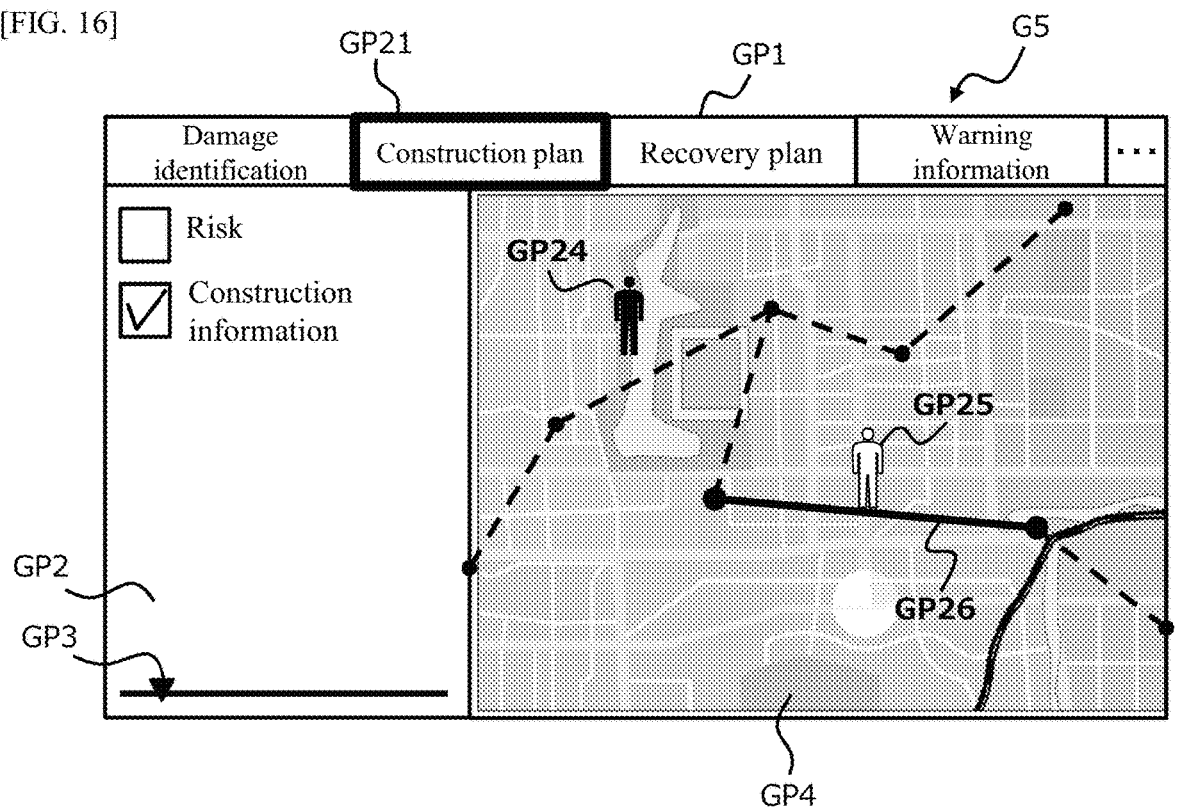

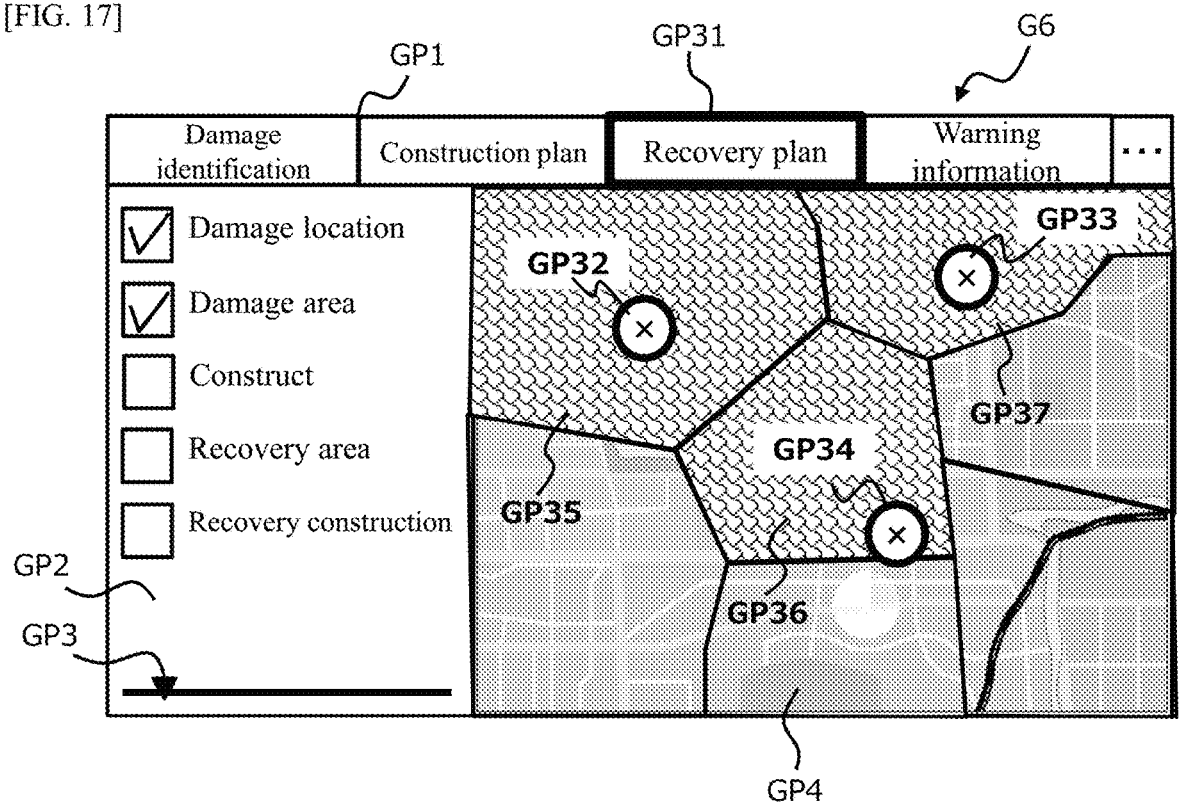
[FIG. 17]

[FIG. 18]
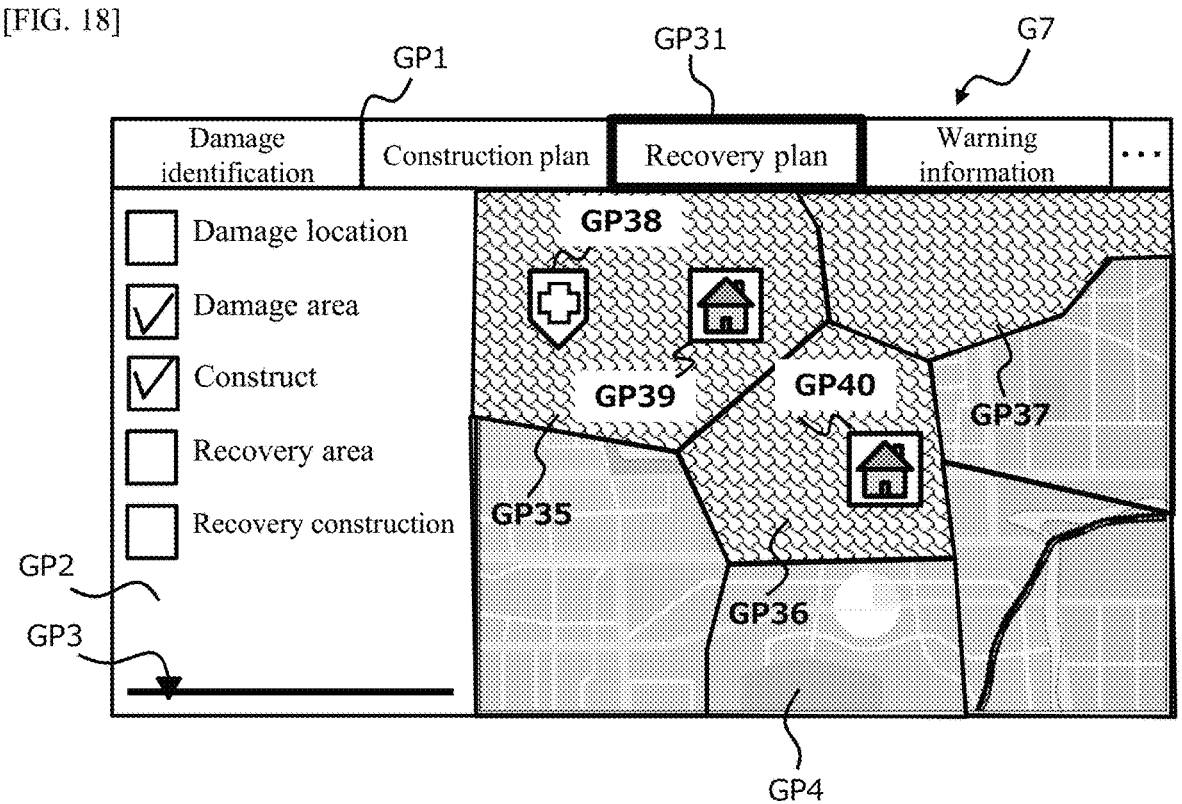

[FIG. 19]
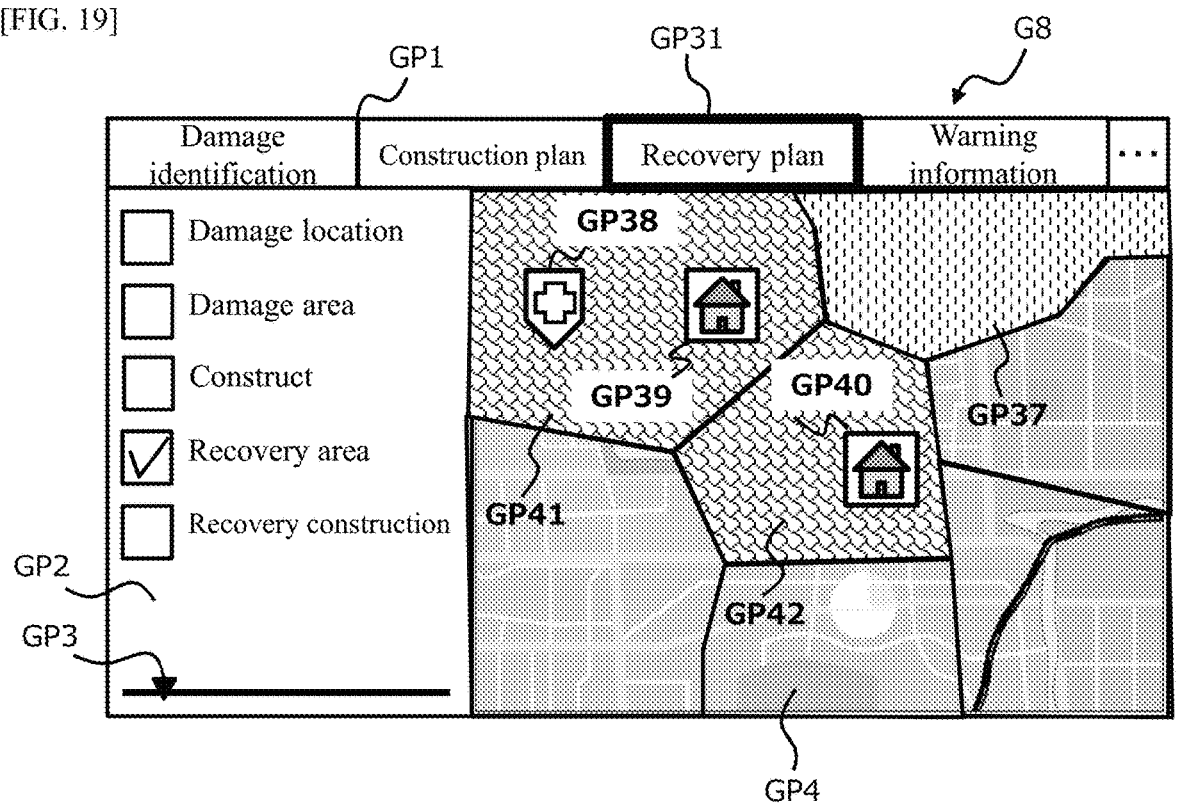

[FIG. 20]
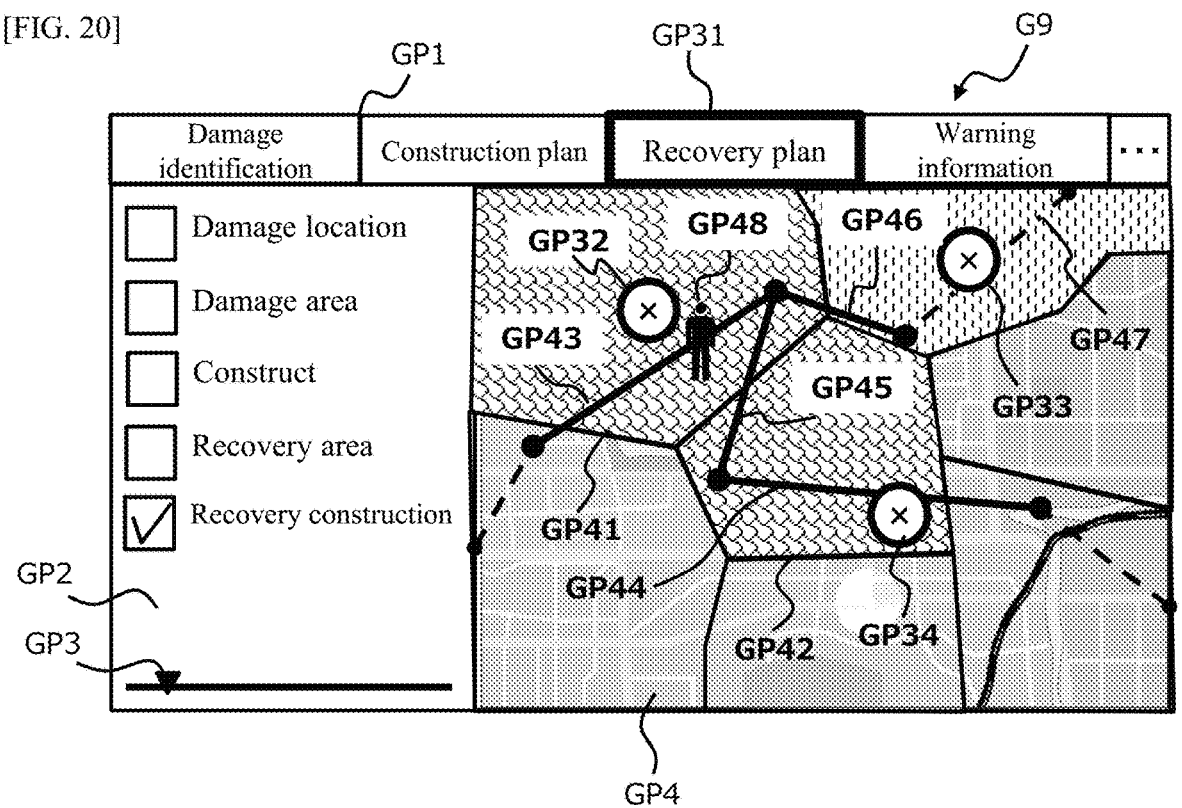

[FIG. 21]
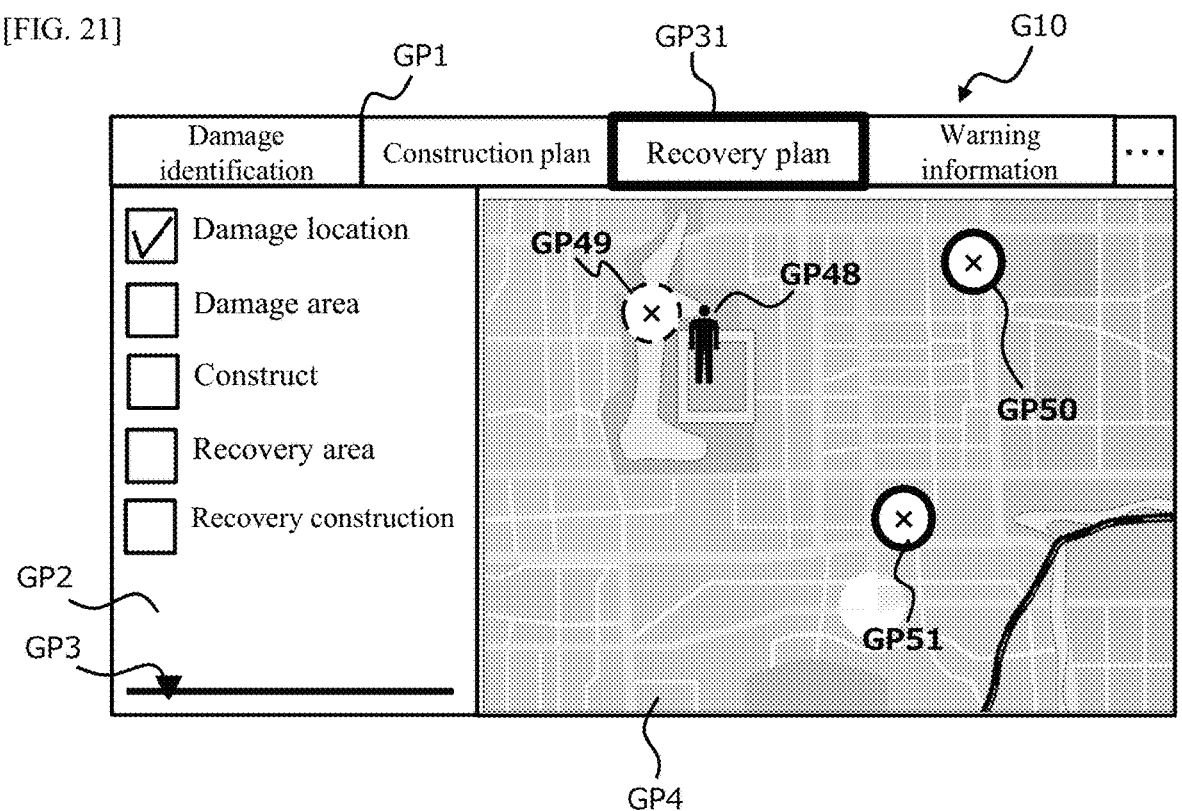

[FIG. 22]
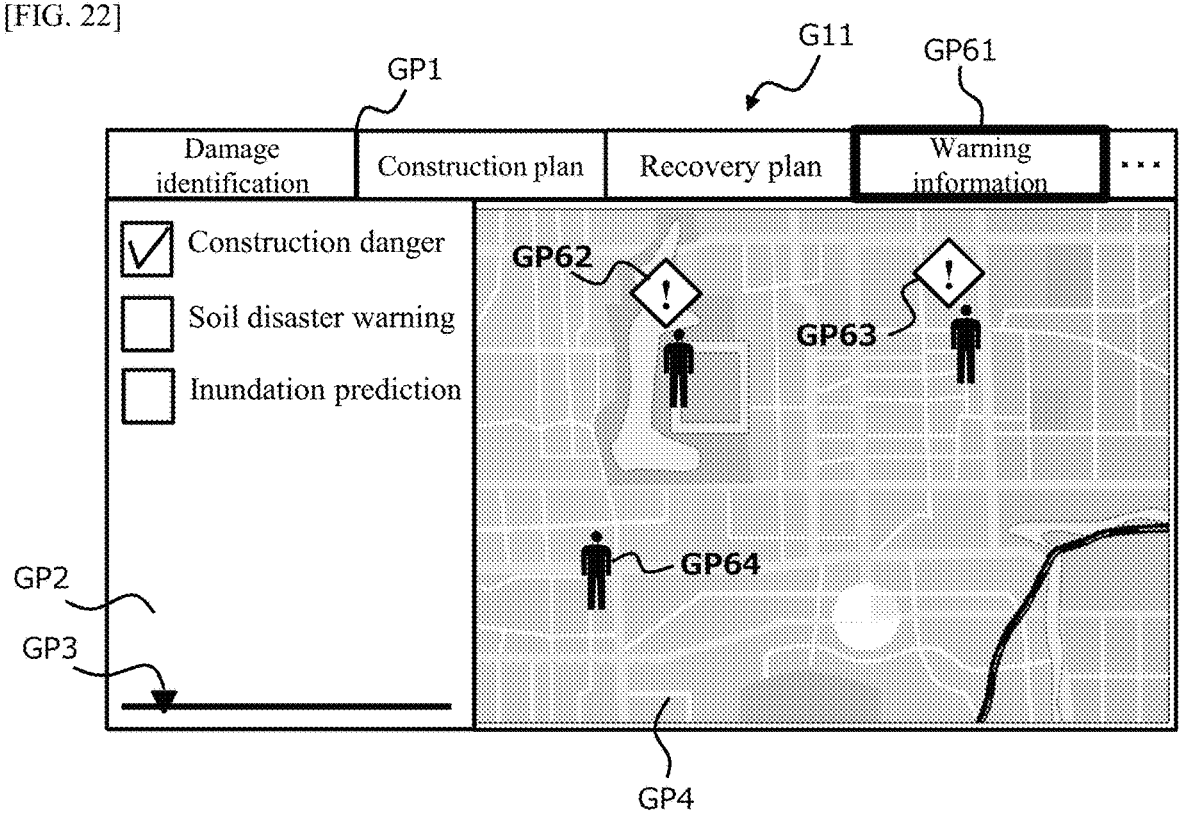

[FIG. 23]
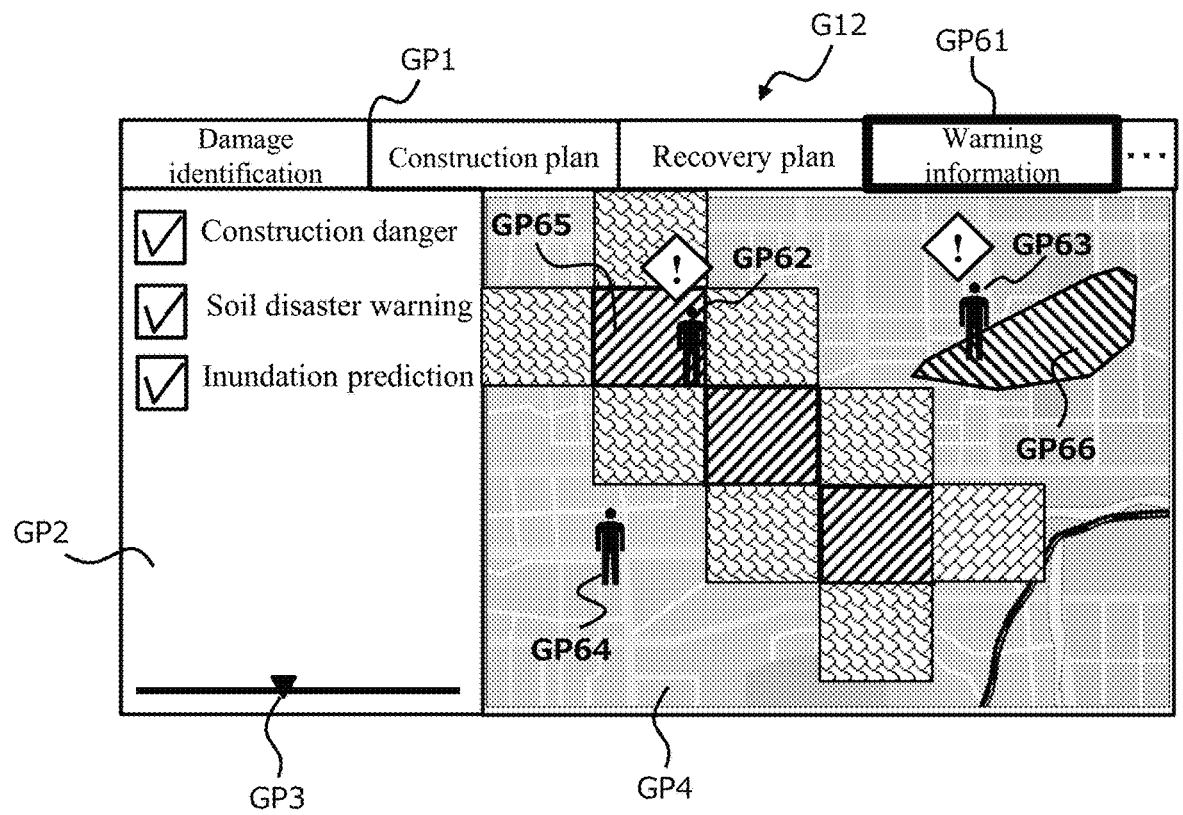

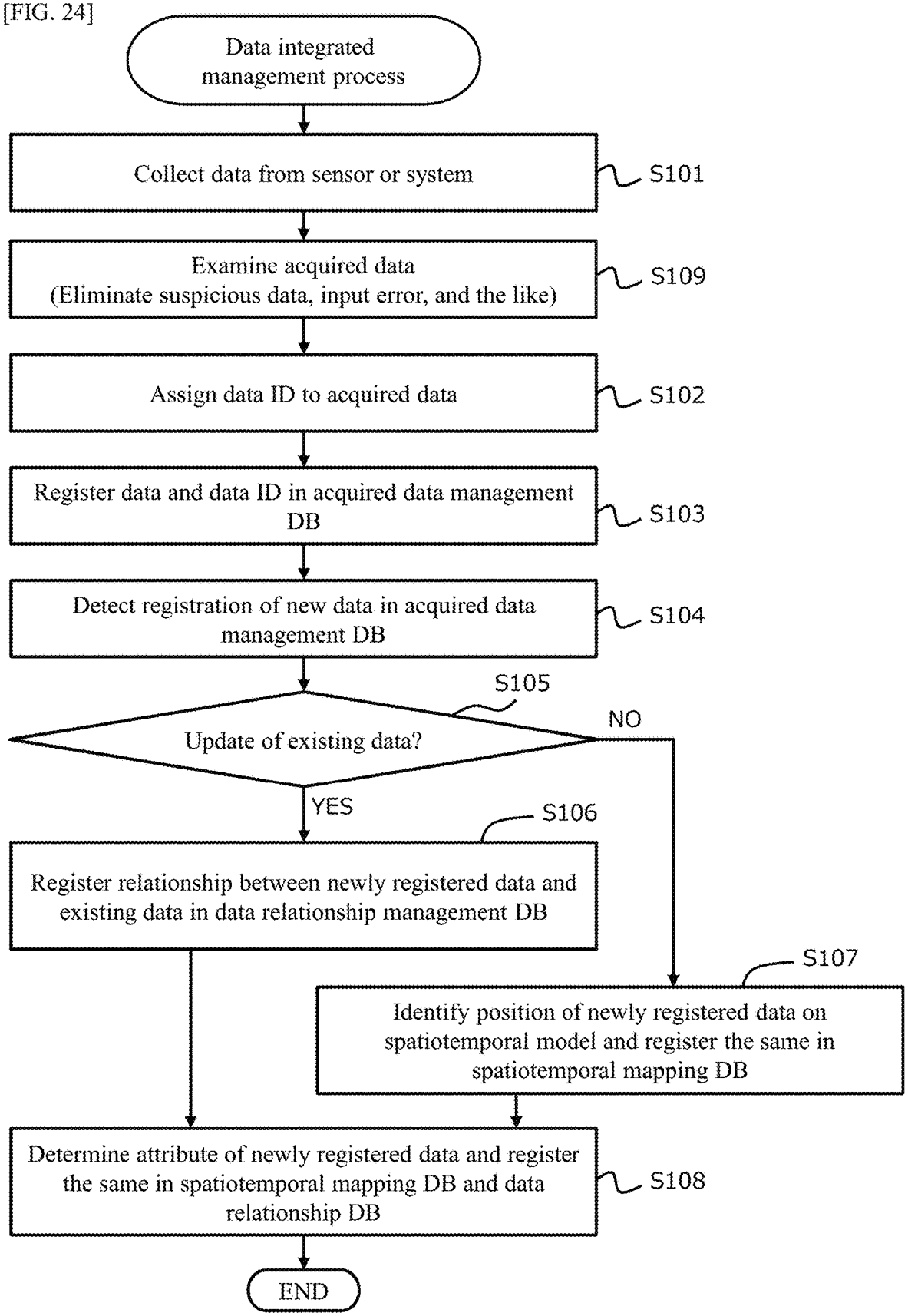

[FIG. 25]
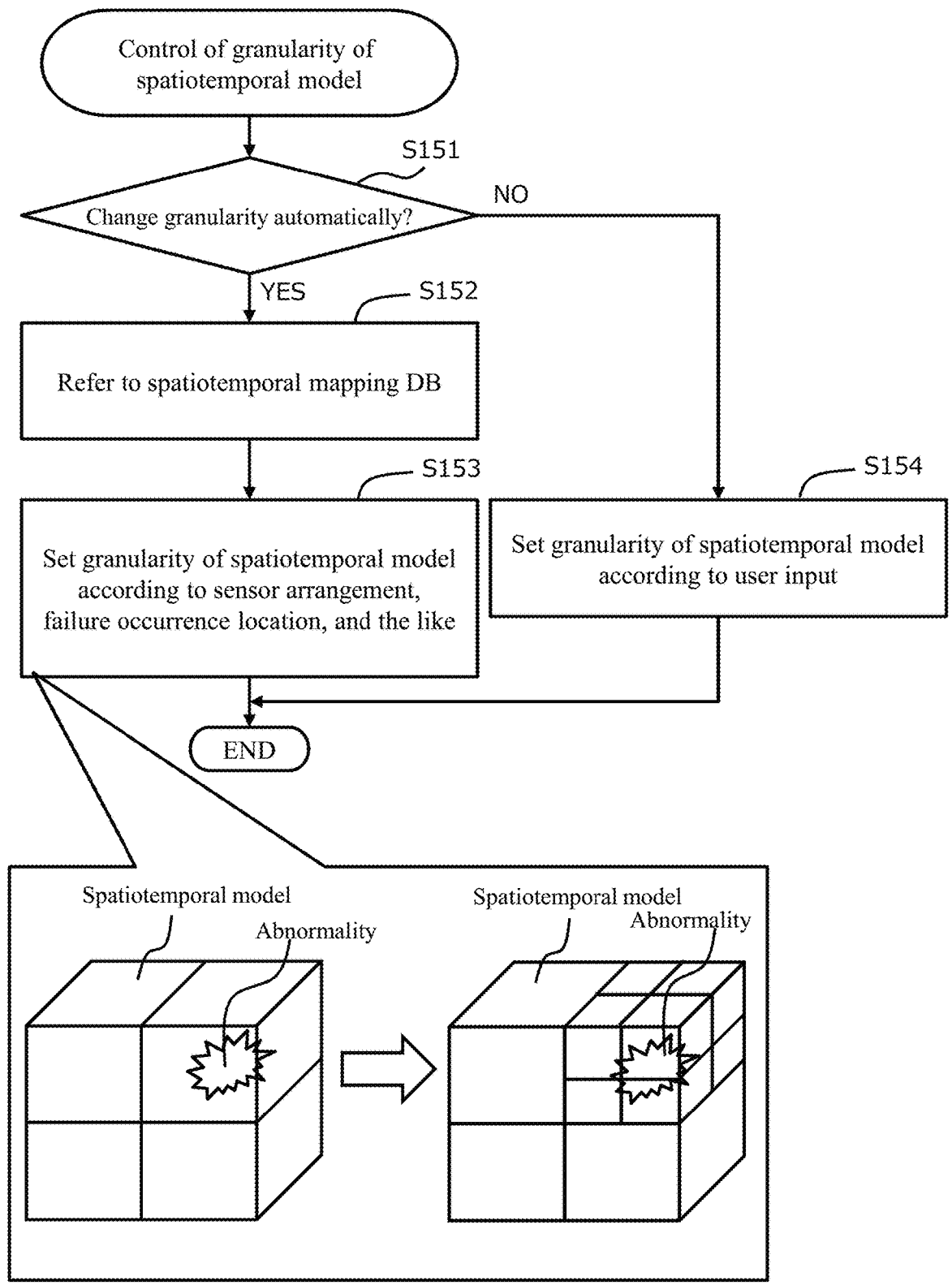

CONSTRUCT INFORMATION MANAGEMENT SYSTEM AND METHOD

TECHNICAL FIELD

The present invention relates to a construct information management system and method.

BACKGROUND ART

As a conventional technique, a system which allows each business operator to share management information related to registered and updated construction information and process information in pipeline map information (PTL 1). In this way, PTL 1 supports decision making in construction execution as to from which business operator, a permission is to be obtained.

CITATION LIST

Patent Literature

[PTL 1]
Japanese Patent Application Publication No. 2007-004497

SUMMARY OF INVENTION

Technical Problem

However, in PTL 1, sensor information on sensors installed on a construct or the like owned by each business operator and construction information for a construct owned by each business operator are shared on a map. Therefore, in PTL 1, it is difficult to mutually utilize information from sensors and systems installed on constructs or the like owned by various organizations.

The present invention has been made in view of the above-described problems and an object thereof is to provide a construct information management system and method for enabling handling of different types of data.

Solution to Problem

In order to solve the problem, a construct information management system according to an aspect of the present invention is a construct information management system for managing information related to a construct, including: a data collection unit configured to collect different types of source data related to different types of constructs from prescribed data sources and retain the collected source data; and a data management unit configured to map the collected source data onto a prescribed spatiotemporal model, acquire prescribed data corresponding to input data on the basis of at least mapping information on the prescribed spatiotemporal model, and process and output the acquired prescribed data.

Advantageous Effects of Invention

According to the present invention, it is possible to map different types of source data related to different types of constructs onto a prescribed spatiotemporal model, acquire prescribed data corresponding to input data on the basis of at least mapping information onto the prescribed spatiotemporal model, and process and output the acquired prescribed data.

BRIEF DESCRIPTION OF DRAWINGS

FIG. 1 is a diagram illustrating an overall configuration of a construct integrated management system.
FIG. 2 is a block diagram illustrating a functional configuration of the construct integrated management system.
FIG. 3 is a diagram illustrating a construct integrated management process sequence.
FIG. 4 is a diagram illustrating a configuration of an acquired data management database (DB).
FIG. 5 is a diagram illustrating a configuration of a spatiotemporal mapping DB.
FIG. 6 is a diagram illustrating a configuration of a data relationship management DB.
FIG. 7 is a diagram illustrating a configuration of a generated data management DB.
FIG. 8 is a flowchart illustrating a data integrated management process.
FIG. 9 is a flowchart illustrating an impact calculation process.
FIG. 10 is a flowchart illustrating a data generation and display process.
FIG. 11 is a flowchart illustrating a data editing process.
FIG. 12 illustrates an example of displaying an impact on a construct on a damage condition identification screen.
FIG. 13 illustrates an example of displaying the degree of impact on the damage condition identification screen.
FIG. 14 illustrates an example of displaying the situation of areas on the damage condition identification screen.
FIG. 15 illustrates an example of displaying risk information on a construction plan screen.
FIG. 16 illustrates an example of displaying construction information on the construction plan screen.
FIG. 17 illustrates an example of displaying a damaged area on a recovery plan screen.
FIG. 18 illustrates an example of displaying an impact on a construct on the recovery plan screen.
FIG. 19 illustrates an example of displaying a priority recovery area on the recovery plan screen.
FIG. 20 illustrates an example of displaying a priority recovery location and a reconstruction setting on the recovery plan screen.
FIG. 21 illustrates an example of displaying a damaged location on the recovery plan screen.
FIG. 22 illustrates an example of displaying a construction danger on a warning information presentation screen.
FIG. 23 illustrates an example of displaying an impact factor on the warning information presentation screen.
FIG. 24 is a flowchart illustrating a data integrated management process according to a second embodiment.
FIG. 25 is a flowchart illustrating a process of controlling the granularity of a spatiotemporal model according to a third embodiment.

DESCRIPTION OF EMBODIMENTS

Hereinafter, an embodiment of the present invention will be described with reference to the drawings. The present embodiment will be described with reference to the overview of FIG. 1.

In the present embodiment, for example, different types of source data related to different types of constructs are mapped onto a common spatiotemporal model so that information on an impact and/or risk on another construct or another activity, of the states of different types of constructs, management of an activity such as a maintenance activity on each construct, and a construct state and management of an activity is presented to users. The construct information management system according to the present embodiment assists users in identifying abnormalities and planning maintenance activities quickly and efficiently, for example. The present invention can be broadly applied to other fields without being limited to the example described in the embodiments.

Examples of the construct include an underground pipe, a building, a road, a road construction. Examples of the underground pipe include a water and sewer pipe, a gas pipe, and a conduit pipe. Examples of the road construction include traffic lights and communication devices.

In the present embodiment, the states of different types of constructs and maintenance activities and information on the impact and risk thereof are managed in a comprehensive manner and are provided to users so as to assist construct management and operation companies in identifying abnormalities and performing maintenance activities quickly and efficiently. For example, by utilizing detailed data from sensors installed on constructs managed by various other organizations as well as sensors installed on constructs managed by a subject organization and overview information from other system primarily processing such pieces of data, abnormalities are detected, recovery locations are identified, a recovery plan is assisted, and the risk of activities is provided to users.

Another example of the construct information management system according to the present embodiment is a system for managing constructs and maintenance activities and calculating the impact thereof, including: a data collection unit, a data integrated management unit, and an impact calculation unit, wherein the data collection unit includes: a data collection function of collecting data from systems owned by users or organizations or sensors installed on constructs; and a data registration function of retaining the collected data, the data integrated management unit includes: a spatiotemporal mapping function of managing the retained data in correlation with a temporal and geographic space; a relationship extraction function of correlating the pieces of retained data and manages the relationship thereof; and a data providing function of processing one or a plurality of pieces of data to generate data, and the impact calculation unit includes a data creation function of calculating an impact on a construct or an activity such as a construction using the data managed by the spatiotemporal mapping function.

The above-described configuration and the configuration of the embodiments to be described later are examples for describing the present invention only, and the scope of the present invention is not limited to the configuration disclosed in the embodiments or examples.

According to the present embodiment, in urban construct management associated with a number of information providers and users, it is possible to narrow down information (including information which is not recognized by users) to be provided to users efficiently and effectively and integrate the pieces of information. Due to this, according to the present embodiment, it is possible to present the impact on constructs and maintenance activities managed by a subject organization using the sensor data of other organizations and the information obtained from systems and assist users in identifying abnormalities and perform maintenance activities quickly and efficiently.

Embodiment 1

A first embodiment will be described with reference to FIGS. 1 to 23. In the present embodiment, as for users who performs maintenance and repair of underground pipes and facilities, detailed data from sensors installed on constructs of various other organizations as well as sensors installed on constructs managed by the subject organization and overview information from other systems primarily processing such pieces of data are used. Due to this, in the present embodiment, it is possible to provide information related to the impact and risk of the constructs and maintenance activities to users as well as managing the states of underground pipes and maintenance activities.

A construct integrated management system 1 as a "construct information management system" according to the present embodiment is not limited to management of underground pipes but can be used for management of distribution warehouse and delivery activities and management of road and transportation, for example.

FIG. 1 is a diagram illustrating an overall configuration of a construct integrated management system 1. The construct integrated management system 1 is constructed using a computer 10. The computer 10 includes various resources such as, for example, a microprocessor, a main storage device, an auxiliary storage device, an input/output circuit, and a communication circuit (which are not illustrated). The microprocessor calls a prescribed computer program stored in the auxiliary storage device into a main storage device and executes the same whereby prescribed functions 11 to 16 of the construct integrated management system 1 to be described later are realized. The prescribed functions may be realized by a cooperation of a computer program and a dedicated hardware circuit as well as by the computer program only.

The construct integrated management system 1 includes, for example, a data collection unit 11, a data integrated management unit 12, an impact calculation unit 13, a user management unit 14, an application management unit 15, and an interface unit 16, which will be described later. In the following description and drawings, an application will be abbreviated as an app.

The data collection unit 11 collects and retains prescribed source data from a prescribed data source. Examples of the prescribed data source include various systems 2A and 2B owned by an infrastructure supply business operator or an organization such as a disaster prevention related organization and various sensors 3A and 3B installed on a construct or the like. The data from these system 2A and 2B and sensors 3A and 3B is transmitted to the data collection unit 11 via a communication network CN and is retained therein.

The system 2A and 2B are referred to as a system 2 when they are not distinguished. Similarly, the sensors 3A and 3B are referred to as a sensor 3 when they are not distinguished. Examples of the sensor 3 include a water leak detection sensor, a pressure sensor, a gas detection sensor, a color sensor, a temperature sensor, a humidity sensor, an image sensor, an ultrasonic sensor, an infrared sensor, and a torque sensor.

The data collection unit 11 acquires data obtained by the system 2 primarily processing the data (also referred to as sensor data or raw data) from the sensor 3 or the data from one or a plurality of sensors 3 via the communication network CN and stores the same.

The data integrated management unit 12 as a "data management unit" manages the data stored in the data collection unit 11 by assigning prescribed metadata thereto. Examples of the prescribed metadata include a relationship with a spatiotemporal model (a relationship with a temporal and geographic space), a relationship with other data, and attributes of data (basic maps and features, incidents, states and damages, behaviors, and the like).

The data integrated management unit 12 processes one or a plurality of pieces of data on the basis of the assigned metadata according to a request from the application management unit 15 to generate data and transmits the data to the application management unit 15.

The impact calculation unit 13 calculates an impact on activities, of a construct, a maintenance construction, or the like from the data stored in the data collection unit 11.

The user management unit 14 manages users (not illustrated) who use the construct integrated management system 1 using user terminals 4A and 4B and executes access authentication when a user uses the system 1. The user terminals 4A and 4B will be referred to as a user terminal 4 when they are not particularly distinguished.

The application management unit 15 stores applications for managing the state of a construct and a maintenance activity and generating information on the impact and risk thereof.

The interface unit 16 receives information input from the user terminal 4 and provides information to the user terminal 4. The construct integrated management system 1 and the user terminals 4 may be connected directly or may be connected via a network such as a local network or the Internet. Data may be moved using a recording medium such as a flash memory instead of the communication network.

The user terminal 4 is configured as a computer terminal such as a desktop personal computer, a table personal computer, or a wearable personal computer, for example. The user terminal 4 includes an information input device and an information output device (which are not illustrated). Examples of the information input device include a keyboard, a pointing device such as a mouse, a touch panel, and an audio input device. Examples of the information output device include a display, a printer, and an audio synthesis device.

FIG. 2 is a diagram illustrating a functional configuration of the construct integrated management system 1. The data collection unit 11 includes a data collection function 111, a data registration function 112, and an acquired data management DB 113, for example.

The data collection function 111 collects the data from various sensors 3 and the data (the data obtained by primarily processing the sensor data) from various systems 2. The data registration function 112 registers the collected data in the acquired data management DB 113.

The data integrated management unit 12 includes a spatiotemporal mapping function 121, a relationship extraction function 122, a data providing function 123, a spatiotemporal mapping DB 124, a data relationship management DB 125, and a generated data management DB 126, for example.

The spatiotemporal mapping function 121 as a "spatiotemporal mapping unit" registers the data stored in the acquired data management DB 113 and the relationship thereof in the spatiotemporal mapping DB 124 in correlation with a spatiotemporal model (in correlation with a temporal and geographic space).

The relationship extraction function 122 as a "relationship extraction unit" registers the relationships of the pieces of data stored in the acquired data management DB 113 in the data relationship management DB 125 in correlation. Furthermore, the relationship extraction function 122 assigns metadata such as attributes (basic maps and features, incidents, states and damages, behaviors, and the like) of respective pieces of data in the data relationship management DB 125.

The data providing function 123 generates data to register the generated data in the generated data management unit 126 and provide the same to the application management unit 15. The data providing function 123 processes one or a plurality of pieces of data on the basis of the assigned metadata according to a request from the application management unit 15, for example, to generate data. Furthermore, the data providing function 123 causes the impact calculation unit 13 to calculate an impact on a construct and activities to generate data.

The impact calculation unit 13 includes a data receiving function 131 and a data creation function 132, for example. The data receiving function 131 receives data for calculating an impact on a construct and an activity such as a maintenance construction from the data stored in the spatiotemporal mapping DB 124 and receives an impact calculation request from the data providing function 123. The data creation function 132 calculates an impact on a construct or an activity such as a maintenance construction using the received data.

The user management unit 14 includes a user authentication function 141, a data verification function 142, a user management DB 143, and a data use management DB 144. The user authentication function 141 registers information (a user name, a password, and the like) related to the user who uses the system 1 in the user management DB 143 and performs access authentication when using the system 1. The data verification function 142 sets a user who can use the respective pieces of data handled by the system 1 to register the user in the data use management DB 144 and determines whether it is possible to generate or provide data according to the user when generating or providing data.

The application management unit 15 retains applications 151 to 154 for managing the state of a construct such as an underground pipe and a maintenance activity and generating information on an impact and a risk thereof.

The abnormality detection application 151 detects a construct damage such as a water leakage occurrence location and presents the same to a user. The construction plan assistance application 152 calculates an impact on a construct managed by a subject organization, of a damage such as a water leakage occurrence and a recovery activity therefor and presents the calculated impact to the user as information for assisting a construction plan and a user's activity together with the data observed by the sensor 3.

The recovery plan assistance application 153 presents a location to be recovered preferentially using the observation data of the sensors 3 and the like in the event of a disaster, a damage such as a water leakage occurrence, a recovery activity therefor, and disaster related data provided from the system 2 such as a disaster prevention system. The safety compliance application 154 generates and presents risk information which has an impact on a recovery activity using the recovery activity information and the disaster related data provided from the system 2 such as a disaster prevention system.

The interface unit 16 includes a menu selection function 161, an information input function 162, and an information output function 163, for example. The menu selection function 161 provides a menu selection screen for selecting a function to be used from the functions provided by the system 1 to the user terminal 4, for example. The information input function 162 receives the input of an information display request from the user terminal 4. The information output function 163 presents information output by the respective applications of the application management unit 15 to the user terminal 4.

FIG. 3 illustrates an example of a construct integrated management sequence. In the construct integrated management system 1, this sequence is a basic process for managing the state of a construct such as an underground pipe and maintenance activities and presenting information on the impact and risk thereof to users so as to assist the users in identifying abnormalities to realize quick and efficient maintenance activities.

The data collection function 111 of the data collection unit 11 collects sensor data and data obtained by a system primarily processing the same via the communication network CN from an infrastructure supply business operator, various systems 2 owned by an organization such as a disaster prevention related organization, and various sensors 3 installed on a construct or the like (Si). The data registration function 112 registers the collected data in the acquired data management DB 113 (S12).

When new data is added to the acquired data management DB 113, the relationship extraction function 122 of the data integrated management unit 12 examines whether the added data is updated data of acquired data and registers a relationship between the pieces of data before and after update in the data relationship management DB 125 when the added data is updated data (S13).

The spatiotemporal mapping function 121 registers the data added to the acquired data management DB 113 and the relationship thereof in the spatiotemporal mapping DB 124 in correlation with a common spatiotemporal model (in correlation with a temporal and geographic space) (S14).

The relationship extraction function 122 assigns metadata such as attributes of respective pieces of data (basic maps and features, incidents, states and damages, behaviors, and the like) to the data added to the acquired data management DB 113 and registers the same in the data relationship management DB 125 (S15).

When a user logs into the system 1 from the user terminal 4 using a user ID and a password registered in advance, the menu selection screen provided by the menu selection function 161 is displayed on the screen of the user terminal 4 (S16).

In the menu selection screen, for example, a user can select a desired application among the abnormality detection application 151, the construction plan assistance application 152, the recovery plan assistance application 153, and the safety compliance application 154. When the user selects one of the apps, an information input screen is provided to the user terminal 4 by the information input function 162. The user inputs a request for obtaining desired information via the information input screen (S16).

When a request is input from the user, each of the applications ("app" in the drawings) of the application management unit 15 sends a request for necessary information to the data providing function 123 of the data integrated management unit 12 according to the request (S17).

The data providing function 123 generates data according to the request from any one of the applications 151 to 154 of the application management unit 15 and transmits the generated data to the impact calculation unit 13. For example, the data providing function 123 acquires one or a plurality of pieces of data from the spatiotemporal mapping DB 124, integrates the data to generate data, and transmits the generated data and an impact calculation request to the data receiving function 131 of the impact calculation unit 13.

The data receiving function 131 of the impact calculation unit 13 delivers the data and the impact calculation request received from the data providing function 123 to a data generation function 132 (S19). The data generation function 132 calculates an impact on a construct and activities on the basis of the impact calculation request with respect to the delivered data to generate data and transmits the generated data to the data providing function 123 (S20).

The data providing function 123 registers the received generated data in the generated data management DB 126 and transmits the generated data to the requesting applications 151 to 154 of the application management unit 15 (S21).

The spatiotemporal mapping function 121 registers the generated data added to the generated data management DB 126 and the relationships thereof in the spatiotemporal mapping DB 124 in correlation with the spatiotemporal model (S22).

The relationship extraction function 122 registers the relationship between the generated data and the source data (the plurality of pieces of integrated data and the data used for calculating the impact) in the data relationship management DB 125 in correlation (S23). Furthermore, the relationship extraction function 122 assigns metadata such as attributes (incidents, states and damages, activities, and the like) to the generated data and registers the same in the data relationship management DB 125 (S23).

The applications 151 to 154 of the application management unit 15 transmits the generated data received from the data providing function 123 or data generated by processing the received generated data using the functions of the applications to the interface unit 16 (S24). The data generated by the processing function of the application is registered in the generated data management DB 126 (S24).

The information display function 163 of the interface unit 16 displays the data received from the applications 151 to 154 on the screen of the user terminal 4 (S25).

A configuration example of a database used by the construct integrated management system 1 will be described with reference to FIGS. 4 to 7.

FIG. 4 is an example of the acquired data management DB 113. The table of the acquired data management DB 113 includes columns including a data ID 1130, a data name 1131, an acquisition time point 1132, a providing source 1133, and a use range 1134, for example.

The data ID 1130 is information for identifying the raw data (latitude and longitude, a measurement time point, a numerical value, and the like) RD acquired via the communication network CN from the systems 2 and the sensors 3. The data name 1131 is information expressing a data content. The acquisition time point 1132 indicates the time point when data was acquired. The providing source 1133 indicates an acquisition source of data. The use range 1134 indicates a limitation such as a data disclosure range.

FIG. 5 is an example of the spatiotemporal mapping DB 124. The table of the spatiotemporal mapping DB 124 includes a spatiotemporal ID 1240, an area name 1241, a data ID 1242, a data name 1243, a latitude, longitude, and altitude 1244, a time point 1245, a value 1246, and an attribute 1247.

The mapping information SM of the present embodiment divides a common spatiotemporal model certain constant intervals and includes a target region, a division interval, each of the divided section, and a spatiotemporal ID for identifying the sections.

The spatiotemporal ID 1240 is information for associating the data collected from the systems 2 and the sensors 3 with the relationship with the sections on the spatiotemporal model. The area name 1241 indicates the name of each section. The data ID 1242 is information for identifying data. The data name 1243 is the name indicating the content of data. The latitude, longitude, and altitude 1244 indicates location information included in the raw data RD identified by the data ID. The time point 1245 indicates time information included in the raw data RD identified by the data ID.

The value 1246 indicates a numerical value and text information included in the raw data RD identified by the data ID. The attribute 1247 is information identified from the item "attribute" 1252 of the data relationship DB 125 by the data ID.

The latitude, longitude, and altitude 1244, the time point 1245, the value 1246, and the attribute 1247 may not be registered as necessary. That is, these values may be omitted if unnecessary.

With the spatiotemporal ID 1240 and the data ID 1242 of each record registered in the spatiotemporal mapping DB 124, it is possible to identify in which section on the spatiotemporal model each data is present. Moreover, it is possible to extract the data present in a certain spatiotemporal model only.

In the mapping information SM, a certain region of the spatiotemporal model may be further subdivided to set the spatiotemporal ID 1240 so that the sizes of respective sections are decreased. Alternatively the same region of the spatiotemporal model may be divided with a plurality of different resolutions (granularities) to set the spatiotemporal ID 1240 for respective resolutions.

FIG. 6 is an example of the data relationship management DB 125. The table of the data relationship management DB 125 includes a data ID 1250, a data name 1251, an attribute 1252, a related data ID 1253, a process ID 1254, and a relationship 1255, for example.

The data ID 1250 is information for identifying data. The data name 1251 is information representing a data content. The attribute 1252 is information indicating data attributes (for example, features, incidents, states and damages, activities, and the like). The related data ID 1253 is information for associating data having a data ID with related data. The process ID 1254 is information identifying by which process, the data having the data ID has been generated. The relationship 1255 is information indicating a relationship between the data having the data ID and data having the data ID registered in the related data ID (for example, an update relationship between old and new data, a causal relationship indicating data (damage) obtained as the result of data (abnormality), and an integration relationship indicating data obtained by integrating a plurality of pieces of data).

FIG. 7 illustrates an example of the generated data management DB 126. The record of the generated data management DB 126 includes a data ID 1260, a data name 1261, an acquisition time point 1262, a process ID 1263, a generation source 1264, and a use range 1265.

The data ID 1260 is information for identifying the generated data (latitude and longitude, a measurement time point, a numerical value, and the like) GD registered by the data providing function 123 in correlation. The data name 1261 is information representing a data content. The acquisition time point 1262 indicates the time when data was generated. The process ID 1263 is information for identifying by which process, the data has been generated. The generation source 1264 is information indicating a generation source of data. The use range 1265 is information indicating a limitation such as a data disclosure range.

FIG. 8 is a flowchart illustrating an example of a data integrated management process procedure.

In step S101, the data collection function 111 of the data collection unit 11 acquires data from the systems 2 and the sensors 3 via the communication network CN.

In step S102, the data registration function 112 of the data collection unit 11 assigns an identification data ID to each piece of data acquired in step S101.

In step S103, the data registration function 112 registers the information on the data acquired in step S101 and the data ID assigned in step S102 in the acquired data management DB 113. For example, data ID="00001", data name="data A", acquisition time point="2017/07/01 12:00: 00", providing source="sensor A", and use range="unlimited" are registered as a record 1135.

In step S104, the spatiotemporal mapping function 121 of the data integrated management unit 12 detects addition of a new record to the acquired data management DB 113.

In step S105, it is determined whether the data corresponding to the record (for example, record 1135) added to the acquired data management DB 113 detected in step S104 is the update data of the data already acquired by referring to the data name 1131 ("data A") and the acquisition source 1133 ("sensor A"). When the data is the update data, step S106 is executed. When the data is not the update data, step S107 is executed.

In step S106, the relationship extraction function 122 of the data integrated management unit 12 registers the relationship between the existing data and the data newly registered in step S103 in the data relationship management DB 125 and executes step S107. For example, when the data RD registered in the record 1135 is the update data of the data registered with data ID="00100", data ID="00001", data name="data A", related data ID="00100", and relationship="update" are registered as a record 1256.

In step S107, the spatiotemporal ID 1240 of the spatiotemporal mapping DB 124 is identified for the data acquired in step S101 on the basis of time point information and location information (for example, latitude, longitude, and altitude) and the data ID 1130 and the spatiotemporal ID 1240 assigned to the data acquired in step S101 are registered in correlation. For example, the position on the spatiotemporal space corresponding to the time point and the location included in the data RD registered in the record 1135 is present in the section indicated by spatiotemporal ID="000010" on the mapping information 1249, spatiotemporal ID="000010", data ID="00001", and related information (latitude, longitude, and altitude, time point, and the like) are registered as a record 1248.

Here, as for data extending over a plurality of sections such as data having a length like a water pipe, data having a region like an inundation area, and data having a plurality of time periods like inundation change prediction, records having different spatiotemporal IDs are registered for the same data ID. Due to this, it is possible to handle pieces of data having different resolutions commonly from various data sources.

In step S108, the attributes (for example, features, incidents, states and damages, activities, and the like) of the data corresponding to the record registered in step S107 are determined and are registered in the attribute 1247 of the record of the corresponding data in the spatiotemporal mapping DB 124. Furthermore, the attributes are also registered in the attribute 1252 of the record corresponding to the data ID in the data relationship management DB 125 (S108). For example, it is determined that the attribute is "move" when the location information is changed as compared to the data in the relation of "update" in the data relationship management DB 125 and "dynamic" when the value is changed.

"Activity", "damage", or the like is identified and registered on the basis of the metadata (attribute information set by an information providing source) described in the data acquired in step S101, a relationship extraction function in step S117 to be described later, and the metadata provided from various applications in step S132 to be described later. Here, the attribute information assigned uniquely by an information providing source or the like may be converted to a common term by a language analysis process and the term may be also registered as attribute information. For example, attribute information set as "collapse" may be converted to "damage" having a similar meaning by a language analysis process and "collapse" and "damage" are registered together. In this way, it is possible to handle information given by various users in a unified manner.

FIG. 9 is a flowchart illustrating an example of an impact calculation process procedure.

In step S111, the data providing function 123 of the data integrated management unit 12 acquires one or a plurality of pieces of data from the acquired data management DB 113 by referring to the spatiotemporal mapping DB 124 according to the requests from the applications 151 to 154 of the application management unit 15 and transmits the acquired data and the impact calculation request to the data receiving function 131 of the impact calculation unit 13. Here, each application designates a certain construct or activity to request such that the impact thereof is calculated and designates a spatial range or a time to request such that an impact on a construct or activity in that range is calculated. Only data usable by the user including the information on the user who uses the application among the requests from the applications may be acquired by referring to the use range 1134 of the acquired data management DB 113.

In step S112, the data receiving function 131 receives data necessary for calculating the impact of the designated range.

In step S113, the data generation function 132 of the impact calculation unit 13 calculates an impact on a construct or activity, of the data received in step S112 on the basis of the impact calculation request to generate data. Here, as a calculation method, an impact on another construct and activity and observation data with respect to a construct and activity is calculated on the basis of a calculation function.

The calculation function is, for example, "(spatiotemporal distance between impact calculation target construct and activity and state and damage of another construct)×relationship×weight parameter)". The relationship is a correlation (the extent of impact) between a construct and an abnormality in another construct, a correlation between a construct and a damage of another construct, a correlation between a construct and an activity, a correlation between a construct and a risk (disaster such as earthquake), and a correlation between an activity and a risk (disaster such as earthquake). For example, the degree of impact on a gas pipe is calculated from a damage (water leakage of a water pipe) near a construct (a gas pipe) of a subject organization, an activity (a construction performed by another organization, and sensor observation data (water content in soil). The degree of impact (road damage or the like) on a road is calculated from a damage (water leakage of a water pipe) near a construct (a road) of a subject organization and the degree of impact (the degree of danger) on an activity is calculated from a damage risk (soil disaster warning data) near a subject organization activity. The weight parameter is a parameter for correcting the correlation on the basis of an observed impact when an impact is observed actually.

In step S114, the data generation function 132 assigns an identification process ID to the data generated in step S113 and transmits the generated data and the process ID to the data providing function 123 of the data integrated management unit 12.

In step S115, the data providing function 123 registers the received generated data and the process ID in the generated data management DB 126. For example, data ID="00101", data name="data y", generation time point="2017/07/01 12:35:02", process ID="002", generation source="data provision", and use range="user B only" are registered as a record 1267. Furthermore, the generated data is transmitted to the requesting applications 151 to 154 of the application management unit 15. Here, the use range is identified from the use range 1134 of the data (the data acquired in step S111) used for impact calculation. The processing content (the data ID of the data used for the impact calculation process, the calculation function, and the like) may be stored in association with the process ID as a process log.

In step S116, the spatiotemporal mapping function 121 identifies the spatiotemporal ID 1240 of the spatiotemporal mapping DB 124 with respect to the generated data added to the generated data management DB 126 on the basis of time point information and location information (for example, latitude, longitude, and altitude) and registers the process ID assigned to the generated data in correlation with the data ID 1130 and the spatiotemporal ID 1240. For example, when the position on the spatiotemporal space corresponding to the time point and the location included in the generated data received in step S115 is present in a section indicated by the spatiotemporal ID="000020" on the mapping information 1249, spatiotemporal ID="000020", data ID="00101", and the related information (latitude, longitude, and altitude, time point, and the like) are registered as a record 1249.

In step S117, the relationship extraction function 122 registers the relationship between the generated data and the source data thereof (a plurality of pieces of integrated data and the data used for impact calculation) in the data relationship management DB 125 in correlation. Here, the relationship includes a relationship (for example, an update relationship between old and new data, a causal relationship indicating data (damage) obtained as the result of data (abnormality), and an integration relationship indicating data obtained by integrating a plurality of pieces of data) 1245 between the data having the data ID and the data having the data ID registered in the related data ID. For example, data ID="00101", related data ID="00001, 00002" (the data ID of data used for impact calculation), process ID="002", and relationship="integration" of the generated data received in step S115 are registered as a record 1257. Here, when the generated data (having the same value in the related data ID on the data relationship management DB) generated by integrating the pieces of data having data ID="00001" and data ID="00002" is already registered in the generated data management ID 126 (for example, registered as data ID="00090"), the relationship with the data of data ID="00090" is added as a new record as "update".

In step S118, metadata such as attributes (incidents, states and damages, activities, and the like) of the generated data is assigned and is registered in the attribute of the record of the data in the data relationship management DB 125 and the spatiotemporal mapping DB 124. For example, it is determined that the attribute is "move" when the location information is changed as compared to the data in the relation of "update" in the data relationship management DB 125 and "dynamic" when the value is changed. The attribute may be determined from the attribute of the data used for integration and may be set by the data providing function on the basis of a setting rule (for example, the attribute of data Y obtained by integrating data A and data B is "damage").

FIG. 10 is a flowchart illustrating an example of a data generation and display process procedure when displaying information to users.

In step S121, the applications 151 to 154 of the application management unit 15 send a request for necessary information to the data providing function 123 of the data integrated management unit 12 according to the request.

Examples of the request type include a case of designating a data name or an information providing source to request for data (request type TA), a case of designating a location or a time to request for data (request type TB), a case of requesting for calculation of impact on a designated range or directly designated construct or an activity (request type TC), and a case of setting data, a construct, or an activity in a monitoring range in advance and receiving data automatically when data or newly calculated impact is present (request type TD). A plurality of pieces of information may be requested simultaneously in a plurality of types.

In step S122, the type of information request in step S121 is determined, and when the type is the request type TA, step S123 is executed. In the case of request type TB, step S125 is executed. In the case of request type TC, processes of steps S112 to S118 are executed. In the case of request type TD, processes subsequent to step S134 are executed.

In step S123, the data providing function 123 of the data integrated management unit 12 searches the acquired data management DB 113 and the generated data management DB 126 on the basis of the designated data name or information providing source according to the requests from the applications 151 to 154 of the application management unit 15 to acquire the requested data (objective data).

In step S124, the data related to the objective data is acquired from the data relationship management DB 125 and the spatiotemporal mapping DB 124 on the basis of the data ID of the objective data acquired in step S123. Here, the related data is data which is a generation source of the data and the data of which the distance to the data on the spatiotemporal space is short. Step S124 may be skipped without being executed as necessary. Here, the processing content of step S124 is similar to the processing content of step S126. Therefore, the content of step S126 is illustrated in FIG. 10 but the content of step S124 is omitted.

In the case of request type TB, in step S125, the data providing function 123 of the data integrated management unit 12 identifies one or a plurality of pieces of data (objective data) from the spatiotemporal mapping DB 124 according to the requests from the applications 151 to 154 of the application management unit 15 and acquires data from the acquired data management DB 113 or the generated data management DB 126.

In step S126, the data related to the objective data is acquired from the data relationship management DB 125 and the spatiotemporal mapping DB 124 on the basis of the data ID of the objective data acquired in step S125. Here, the related data is the generation source data of the data or the data of which the distance to the data on the spatiotemporal space is short. Step S126 may be skipped without being executed as necessary.

In step S127, the data acquired in steps S123 and S124 or the data acquired in steps S125 and S126 is transmitted to the applications 151 to 154 which are the requesting source in step S121.

In step S128, the applications 151 to 154 of the application management unit 15 performs processing based on an algorithm unique to the application using the received data to generate information to be provided to users. Information may be generated by the processing of step S113 using the impact calculation unit 13. Moreover, step S133 may be executed using the received data as it is without performing special processing.

In step S129, a data ID is assigned to the generated data and is transmitted to the data providing function 123 of the data integrated management unit 12.

In step S130, the data providing function 123 registers the received data and the data ID in the generated data management DB 126. For example, data ID="00100", data name="data X", generation time point="2017/07/01 12:30:00", process ID="001", generation source="application a", and use range="unlimited" are registered as a record 1266.

In step S131, the spatiotemporal mapping function 121 identifies the spatiotemporal ID 1240 in the spatiotemporal mapping DB 124 on the basis of the time point information and the location information (for example, latitude, longitude, and altitude) with respect to the data added to the generated data management DB 126 and registers the process ID assigned to the generated data in correlation the data ID 1130 and the spatiotemporal ID 1240.

In step S132, the relationship extraction function 122 registers the relationship between the data received in step S130 and the source data (a plurality of pieces of integrated data and the data ID of the data used for impact calculation) in the data relationship management DB 125 if these pieces of data are provided from an application (are described in the received data). Furthermore, the relationship extraction function 122 registers the metadata such as the attributes (incidents, states and damages, activities, and the like) of the generated data in the data relationship management DB 125 if the metadata is described in the data received from the application in S130.

In step S133, the applications 151 to 154 of the application management unit 15 transmits the data received in step S128 or the data generated using the data to the user terminal 4 with the aid of the information output function 163 of the interface unit 16 and displays the same on the screen of the terminal.

In the case of request type TC, steps S112 to S118 are executed.

In the case of request type TD, in step S134, when data or a newly calculated impact is present, the applications 151 to 154 of the application management unit 15 monitors the presence of newly arrived data by referring to the spatiotemporal mapping DB 124 with respect to data, a construct, or an activity in a monitoring target range set such that the data is received automatically.

When newly arrived data is present in step S135, step S136 is executed. When newly arrived data is not present, step S134 is executed again periodically or at timings set in advance.

In step S136, the applications 151 to 154 of the application management unit 15 executes step S121 to send the requests of the request types TA to TC on the basis of the newly arrived data detected in step S134.

FIG. 11 is a flowchart illustrating an example of a data editing process procedure when changing the records of the data relationship management DB.

In step S141, a user designates data to be edited using the information input function 162 of the interface unit 16 by operating the user terminal 4. A data name or an information providing source may be designated, and data to be edited may be designated by designating a location and a time.

In step S142, the spatiotemporal mapping function 113 displays the value of a record in which the designated data is registered with the aid of the information output function 163 of the interface unit 16.

In step S143, the user edits the value of the record displayed by the information output function 163 using the information input function 162 of the interface unit 16 by operating the user terminal 4. For example, related information in which identification information such as "damage" is stored in the attribute and "maintenance person G" is stored in the value is additionally registered.

In step S144, the spatiotemporal mapping function 113 registers the content of a record of the edited data in the spatiotemporal mapping DB 124. When the same item is present in DBs other than the spatiotemporal mapping DB 124 (for example, the item "attribute" of the data relationship DB 125), the edited content is also applied to such DBs.

Although a case of editing the record registered in the spatiotemporal mapping DB 124 has been described, the same is true for a case of editing the content or the data of another DB such as the data relationship DB 125.

An example of the damage condition identification screen of the abnormality detection application 151 for detecting a construct damage such as a water leakage occurrence location and presenting the same to the user will be described with reference to FIGS. 12 to 14.

An information display screen G1 provided to the user terminal 4 by the interface unit 16 includes a menu display portion GP1, an information input portion GP2, a time point selection portion GP3, and an information display portion GP4, for example. For example, when a user select a damage identification menu GP11, information for acquiring information for assisting in damage condition identifying is displayed in the information input portion GP2 by the abnormality detection application 151.

As illustrated in FIG. 12, a case in which a user selects the current time point in the time point selection portion GP3 and selects "damage detection" in the information input portion GP2 will be described. In this case, the application management unit 15 proceeds to the request type TB in step S121, acquires data of which the attribute is "damage" among the pieces of data on a geographic space in the range displayed in the information display portion GP4 at the current time point, and displays a symbol indicating the data (damage) at a location corresponding to the latitude, longitude, and altitude of each piece of the data on the map of the information display portion GP4.

When the user selects "construct" in the information input portion GP2, the flow proceeds to the request type TC in step S121. The impact of the displayed data (damage) on a construct present on the geographic space in the range displayed in the information display portion GP4 is calculated by the impact calculation unit 13, and an impacted construct is displayed at the corresponding location on the map of the information display portion GP4. For example, water pipes GP14 and GP15 and a building GP16 are displayed as constructs impacted by a water leakage damage (water leakage location) GP12 and a gas pipe damage (gas leakage location) GP13.

As illustrated in the information display screen G2 of FIG. 13, when a user selects "degree of impact" in the information input portion GP2, the degree of impact (accuracy) of the sensor data indicating abnormalities is displayed in the areas at constant intervals on the geographic space in the range displayed in the information display portion GP4 at the current time point. For example, the impact of the displayed data (damage) is calculated for respective areas according to the request type TC in step S121, the degree of impact GP17 on each area, of the sensor data GP12 and GP13 indicating abnormalities is displayed at the corresponding location on the map of the information display portion GP4. With this degree of impact, the possibility of damage (risk) of a construct can be determined for constructs (for example, water pipes and buildings) present on the geographic space in the range displayed in the information display portion GP4.

As illustrated in the information display screen G3 in FIG. 14, when the user selects "area condition" in the information input portion GP2, the flow proceeds to the request type TB, and the data on the geographic space in the range displayed in the information display portion GP4 at the current time point is acquired for the area on the geographic space designated in the information display portion GP4 at the current time point. The pieces of data are displayed in the information display portion GP4 according to the attribute of the acquired data. For example, the data is displayed in the information display portion GP4 such that the condition of the area GP18 is "damage" and the condition of the area GP19 is "damage and activity".

FIGS. 15 and 16 illustrate an example of the construction plan screen G4 provided by the construction plan assistance application 152.

In the construction plan screen G4 which is a part of the information display screen, for example, when the user selects a construction plan menu GP21, selection items "risk" and "construction information" for acquiring information for assisting in a construction plan are displayed in the information input portion GP2 by the construction plan assistance application 152.

When the user sets the current time point in the time point selection portion GP3 and selects "risk" in the information input portion GP2, the flow proceeds to the request type TB in step S121. In this way, the data on the geographic space in the range displayed in the information display portion GP4 at the current time point is acquired.

The construction plan assistance application 152 displays data related to a construct owned by the user among these pieces of acquired data as a symbol (figure) indicating the data at the location corresponding to the latitude, longitude, and altitude of each piece of data on the map of the information display portion GP4.

The impact on the displayed construct is calculated according to the request type TC in step S121 with respect to the construct present on the geographic space in the range displayed in the information display portion GP4. The risk of the construct is calculated from the calculated impact and the risk (aging) of the construct itself and the degree of risk is displayed for the corresponding construct on the map of the information display portion GP4.

For example, the water pipe GP23 is displayed as a construct having a high risk on the basis of the year of installation, a gas pipe damage (gas leakage location) GP22 or the like. In this way, the user can identify the impact risk on a construct of the subject organization from the abnormality and damage information of the construct of another organization as well as the risk (aging) of the construct of the subject organization.

As illustrated in the screen G5 in FIG. 16, when the user selects "construction information" in the information input portion GP2, information related to constructions on the geographic space in the range displayed in the information display portion GP4 at the current time point is displayed.

For example, data of which the attribute is "activity" among the pieces of data on the geographic space in the range displayed in the information display portion GP4 at the current time point is acquired according to the request type TB, and a symbol indicating the data (activity) is displayed at the location corresponding to the latitude, longitude, and altitude of each piece of data on the map of the information display portion GP4. The acquired data is displayed such that whether the data indicates a construction planned by the user or a construction performed by another user can be distinguished. For example, a construction GP24 planned by the user and a construction GP25 performed by the other user are displayed in a distinguished manner.

Furthermore, an impact of the construction GP25 performed by the other user on the displayed construct is calculated according to the request type TC with respect to the construct present on the geographic space in the range displayed in the information display portion GP4. The construct predicted to be impacted is displayed on the map of the information display portion GP4. For example, the water pipe GP26 is displayed as the construct impacted by the construction GP25 performed by the other user. In this way, the user can identify the other construction information (the other organization activity) impacting the construct of the subject organization from the construction information provided from the other organization and the construction information (construction vibration) obtained from sensors.

FIGS. 17 and 18 illustrate an example of the recovery plan screen G6 which is a part of the information display screen provided by the recovery plan assistance application 153.

When a user selects a recovery plan menu GP31, items "damaged location", "damaged area", "construct", "recovery area", and "reconstruction" for acquiring information for assisting in a recovery plan in the event of a disaster or the like are displayed in the information input portion GP2 by the recovery plan assistance application 153.

As illustrated in FIG. 17, when the user sets the current time point in the time point selection portion GP3 and selects "damaged location" in the information input portion GP2, data of which the attribute is "damage" among the pieces of data on the geographic space in the range displayed in the information display portion GP4 at the current time point is acquired according to the request type TB.

These pieces of acquired data are displayed as symbols indicating the data (damage) at the location corresponding to the latitude, longitude, and altitude of each piece of data on the map of the information display portion GP4. Furthermore, when the user selects "damaged area", the impact of the displayed data (damage) is calculated with respect to the area (for example, an area set by the user for the management purpose) set on the geographic space according to the request type TC and an area predicted to be impacted is displayed on the map of the information display portion GP4. For example, the damaged locations GP32, GP33, and GP34 and the impacted areas GP35, GP36, and GP37 are displayed.

As illustrated in the screen G7 in FIG. 18, when the user sets the current time point in the time point selection portion GP3 and selects "damaged area" and "construct" in the information input portion GP2, data indicating a construct among the pieces of data on the geographic space in the range displayed in the information display portion GP4 at the current time point is acquired according to the request type TB. In the process of step S128, the impact of the GP32, GP33, and GP34 on the impacted area is calculated according to the request type TC with respect to the acquired data of the construct. As a result, the construct predicted to be impacted is displayed on the map of the information display portion GP4. For example, a hospital GP38 and shelters GP39 and GP40 are displayed as the construct predicted to be impacted.

As illustrated in the screen G8 in FIG. 19, when the user selects the current time point in the time point selection portion GP3 and selects "recovery area" in the information input portion GP2, the recovery plan assistance application 153 identifies an area in which the number of impacted constructs is large among the areas GP41 (corresponding to GP35 in FIG. 18), GP42 (corresponding to GP36 in FIG. 18), and GP37 predicted to be impacted and displays the same on the map of the information display portion GP4. For example, the areas GP41 and GP42 are displayed. In this way, for example, the user can recognize an area impacting on a number of constructs as an area to be recovered preferentially.

As illustrated in the screen G9 in FIG. 20, when the user sets the current time point in the time point selection portion GP3 and selects a reconstruction in the information input portion GP2, data indicating a construct (pipe) managed by the user among the pieces of data on the geographic space in the range displayed in the information display portion GP4 at the current time point is acquired according to the request type TB.

In the process of step S128, the impact of an area in which the number of impacted constructs is large is calculated for the acquired construct (pipe) data according to the request type TC, and the impacted construct (pipe) is displayed on the map of the information display portion GP4. For example, the constructs (pipes) GP43, GP44, GP45, and GP46 are displayed. In this way, for example, the user can recognize the construct (pipe) to be recovered preferentially and a construction plan (activity) GP48 is registered for the construct which needs to be recovered.

The recovery plan assistance application 153 delivers the construction plan (activity) registered by the user to the data registration function 112 of the data collection unit 11 so that the processes of steps S102 to S108 are executed. In this way, it is possible to register the construction plan (activity) in respective databases.

As illustrated in the screen G10 in FIG. 21, when the user selects "damaged location" in the information input portion GP2, data of which the attribute is "damage" among the pieces of data on the geographic space in the range displayed in the information display portion GP4 at the current time point is acquired according to the request type TB. In step S126, the construction plan (activity) data which is the data in which the spatiotemporal distance is short is acquired as the data related to the acquired data. In the process of step S128, the impact of the construction plan (activity) data is calculated for the acquired damage data according to the request type TC, and the impacted damage data is displayed on the map of the information display portion GP4. For example, damage data 949 is displayed as the damage data impacted by the construction plan (activity) data GP48. In this way, the user can extract an impact (effect) on the damaged location, of an activity from the damage data and the construction (activity) information in the construct and can display a damaged location in which an activity is performed as old data.

FIGS. 22 and 23 illustrate an example of the warning information presentation screen G11 which is a part of the information display screen provided by the safety compliance application 154.

For example, the recovery plan assistance application 154 monitors newly arrived data in the range (time and space) set by the user in advance according to the request type TD in step S121 and informs the user by blinking the caution information menu GP61 when the newly arrived data has an impact on the construction plan (activity) of the user.

When the user selects the caution information menu GP61, items "construction danger", "soil disaster warning", and "inundation prediction" for acquiring information for assisting in construction safety compliance are displayed in the information input portion GP2.

The recovery plan assistance application 154 acquires the construction plan (activity) data of the user according to the request type TA or the request type TB in step S121. In the process of step S128, the recovery plan assistance application 153 calculates the impact of the newly arrived data according to the request type TC with respect to the acquired construction plan (activity) data and identifies the impacted construction plan (activity).

As illustrated in the screen G11 in FIG. 22, when the user selects "construction danger" in the information input portion GP2, the construction plan (activity) data impacted by the acquired construction plan (activity) data and the newly arrived data is displayed on the map of the information display portion GP4.

For example, icons GP62 and GP63 indicating that the data among the pieces of construction plan (activity) data is impacted by the newly arrived data are displayed together with the construction plan (activity) data. In this way, the user can recognize a dangerous construction for which safety cannot be secured.

Furthermore, the recovery plan assistance application 154 automatically acquires the data impacting on the construction plan (activity) of the user and displays the impacted construction plan (activity) data. In this way, the user can recognize information necessary for determination in securing the safety of a construction without identifying all pieces of information possessed by the system 1.

As illustrated in the screen G12 in FIG. 23, the data names of the data impacting on the construction plan (activity) are displays on the information input portion GP2 so that the user can select the same. When the user selects the data names, such pieces of information are displayed on the map of the information display portion GP4.

For example, when the user selects "soil disaster warning", soil disaster warning data GP65 (a section where danger of soil disaster is present) is displayed on the map. When the user selects "inundation prediction", an inundation prediction range GP66 is displayed on the map.

In the time point selection portion GP3 of the information input portion GP2, the user can calculate the impact on the construction plan (activity) data again using the prediction data up to several hours later, for example, by designating the time point. Using this system 1, it is possible to determine how far on the spatiotemporal mapping DB 124, the data will be used in calculating the impact. In this way, the user can recognize a dangerous construction for which safety cannot be secured in advance before being actually exposed to danger.

According to the present embodiment, it is possible to utilize various pieces of data efficiently and effectively using spatiotemporal axes as common axes. For example, due to the spatiotemporal ID 1240 and the data ID 1242 of each record registered in the spatiotemporal mapping DB 124, it is possible to identify a spatiotemporal section in which each data is present.

Furthermore, according to the present embodiment, it is possible to extract data present in a certain space only, which contributes to accelerating data acquisition.

Furthermore, according to the present embodiment, it is possible to manage the state of a construct such as an underground pipe and maintenance activities using a plurality of pieces of data managed on the spatiotemporal space, generate information on the impact and risk thereof, present the same to users so as to assist the users in identifying abnormalities to realize quick and efficient maintenance activities.

Embodiment 2

A second embodiment will be described with reference to FIG. 24. The following embodiments including the present embodiment correspond to modifications of the first embodiment, and the difference from the first embodiment will be described. In the present embodiment, the data registered in the construct integrated management system 1 is examined to eliminate suspicious data and input errors.

FIG. 24 illustrates a flowchart of a data integrated management process according to the present embodiment. The process of FIG. 24 includes new step S109 which is added between steps S101 and S102 as compared to the process described in FIG. 8.

In step S109, it is determined whether the data collected from the sensor 3 or the system 2 in step S101 is normal data.

For example, when an upper limit and a lower limit defining the range of normal data are set, data exceeding the upper limit and data falling below the lower limit can be eliminated as input errors. Alternatively, a serial number may be set to the data from the sensor 3, and if the number is skipped, the corresponding data can be eliminated as suspicious data.

The present embodiment configured in this manner provides the same advantages as the first embodiment. Furthermore, according to the present embodiment, since the data input from the system 2 and the sensor 3 to the construct integrated management system 1 can be examined, the reliability of the system 1 can be improved further.

Embodiment 3

A third embodiment will be described with reference to FIG. 25. In the present embodiment, as described in the first embodiment, the granularity (resolution) of a spatiotemporal model is controlled according to a situation.

FIG. 25 is a flowchart illustrating a process of controlling the granularity of a spatiotemporal model. This process is executed by the spatiotemporal mapping function 121 of the data integrated management unit 12.

The spatiotemporal mapping function 121 determines whether the granularity of a spatiotemporal model is to be changed automatically (S151) and refers to the spatiotemporal mapping DB 124 (S152) when the granularity is changed automatically (S151: YES).

The spatiotemporal mapping function 121 acquires information such as a sensor arrangement state (the number of sensors, an arrangement density, and the like) and a failure occurrence location from the spatiotemporal mapping DB 124 and sets the granularity according to such pieces of information (sensor arrangement information and failure occurrence location information) (S153). For example, sections may be divided finely in a region where the sensor arrangement density is high, and sections may be divided roughly in a region where a small number of sensors are arranged. Sections may be divided finely in a region close to a failure occurrence location and sections may be divided roughly in a region a prescribed distance or more distant from the failure occurrence location.

The user may manually adjust the granularity of the spatiotemporal model using the user terminal 4 (S151: NO, S154).

The present embodiment configured in this manner provided the same advantages as the first embodiment. Furthermore, according to the present embodiment, since the granularity of the spatiotemporal model can be controlled variable according to a sensor arrangement, a failure occurrence location, and the like, the user can determine the situation more finely. The present embodiment may be combined with either the first embodiment or the second embodiment.

The present invention is not limited to the above-described embodiments, and includes various modifications. For example, the above-described embodiments have been described in detail in order to describe the present invention in an easily understandable manner, and are not necessarily limited to the embodiments including all the configurations described above.

Moreover, a part or all of the above-described respective configurations, functions, processing units, processing means, and the like of the embodiment may be realized in hardware, for example, by designing them in an integrated circuit. Moreover, the above-described respective configurations, functions, and the like may be realized in software by a processor interpreting and executing programs for realizing the respective functions. Information such as the programs, tables, and files for realizing the respective functions can be placed in a recording device such as a memory, a hard disk, or an SSD (Solid State Drive), or in a recording medium such as an IC card, an SD card, or a DVD.

Moreover, control lines and information lines which are regarded as necessary for the description are illustrated, and it cannot be said that all the control lines and the information lines necessary in a product are illustrated. Practically, it may be regarded that almost all the configurations are connected to one another.

The components of the present invention can arbitrarily be selected, and the invention having the selected components is also included in the present invention. Furthermore, the configurations described in claims can be combined with any combination other than those specified in claims.

REFERENCE SIGNS LIST

1 Construct integrated management system
2A, 2B Various systems
3A, 3B Various sensors
4A, 4B User terminal
11 Data collection unit
12 Data integrated management unit
13 Impact calculation unit
14 User management unit
15 App management unit
16 Interface unit
111 Data collection function
112 Data registration function
113 Acquired data management database
121 Spatiotemporal mapping function
122 Relationship extraction function
123 Data providing function
124 Spatiotemporal mapping database
125 Data relationship management database
Generated data management database 126
131 Data receiving function
132 Data creation function
141 User authentication function
142 Data verification function
143 User management database
144 Data use management database
151 Abnormality detection app
152 Construction plan assistance app
153 Recovery plan assistance app
154 Safety compliance app
161 Menu selection function
162 Information input function
163 Information output function

The invention claimed is:

1. A construct information management system for managing information related to a construct, comprising one or more processors and one or more non-transitory computer-readable storage media, the non-transitory computer-readable storage media having stored thereon at least:

a data collection unit configured to collect different types of source data related to different types of constructs from prescribed data sources and retain the collected source data;

a data management unit configured to map the collected source data onto a prescribed spatiotemporal model comprising a plurality of sections based on a position and time point included in the source data, acquire prescribed data corresponding to input data on the basis of at least mapping information on the prescribed spatiotemporal model, and process and output information related to state of the construct, the time point, management of an activity on the construct, and at least an impact or risk on another construct or another action by the state of the construct and the management of activity on the basis of the acquired prescribed data; and an impact calculation unit configured to calculate a degree of impact on each of the constructs on the basis of the time point, position in the spatiotemporal model of the source data corresponding to the construct and state of the construct; wherein the data management unit includes:

a spatiotemporal mapping unit configured to map the collected source data onto the prescribed spatiotemporal model based on a position and time point included in the source data;

a relationship extraction unit configured to extract and manage a relationship between the pieces of collected source data; and a data providing unit configured to acquire the prescribed data corresponding to the input data on the basis of the mapping information and the extracted relationship and output a processing result of information related to state of the construct, management of an activity on the construct, and at least an impact or risk on another construct or another action by the state of the construct and the management of activity, processed on the basis of the acquired prescribed data by a prescribed data processing unit, wherein the prescribed data sources include a sensor, the sensor being arranged to observe a physical condition of the construct; and wherein the spatiotemporal mapping unit acquires at least one of a sensor arrangement state and a failure occurrence location and sets a granularity of a portion of the spatiotemporal map based on at least one of the sensor arrangement state and the failure occurrence location, wherein a number of sections in the portion of the spatial temporal map is based on the granularity.

2. The construct information management system according to claim 1, wherein
the prescribed data sources include an information providing system,
the information providing system provides activity information of an activity on the construct as a part of the source data, and
the impact calculation unit calculates a degree of impact on the construct and a degree of impact on an activity on the construct.

3. The construct information management system according to claim 1, wherein
the relationship extraction unit makes a correlation with a property of change in the source data or meaning indicated by the source data as an attribute of the source data and manages the property or meaning.

4. The construct information management system according to claim 1, further comprising:
an interface unit configured to exchange information with a user terminal, wherein
the interface unit includes:
an information input portion configured to receive data input from the user terminal; and
an information output portion configured to output the prescribed data from the data management unit to the user terminal.

5. The construct information management system according to claim 2, further comprising:
a data processing management unit configured to manage the prescribed data processing unit that processes the prescribed data, wherein
the prescribed data processing unit includes at least any one of a computer program for detecting a state of the construct on the basis of the calculation result of the impact calculation unit and a computer program for calculating an impact on another construct or another activity, of a maintenance activity on the construct on the basis of the calculation result of the impact calculation unit.

6. The construct information management system according to claim 4, further comprising:
a user management unit configured to manage users who use the user terminal, wherein
the user management unit includes:
a user authentication unit configured to authenticate users; and
a verification unit configured to determine accessibility to the prescribed data.

7. The construct information management system according to claim 1, wherein
the spatiotemporal mapping unit identifies the spatiotemporal model as a plurality of sections divided at prescribed intervals, and
the relationship extraction unit manages a section corresponding to the source data among the sections as a part of the relationship.

8. The construct information management system according to claim 1, wherein
the impact calculation unit calculates the degree of impact on the activity on the construct on the basis of a position in the spatiotemporal model, of the source data corresponding to the construct and the state of the construct.

9. The construct information management system according to claim 8, wherein
the impact calculation unit corrects a relationship between impacting constructs on the basis of an observation result when the calculated impact is observed.

10. The construct information management system according to claim 1, wherein
the data management unit examines whether the collected source data is normal data.

11. The construct information management system according to claim 7, wherein
the spatiotemporal mapping unit controls a granularity of the section included in at least a partial region of the spatiotemporal model.

12. A construct information management method for managing information related to a construct using a computer, wherein
the computer executes:
collecting different types of source data related to different types of constructs from prescribed data sources, including observed physical conditions provided by sensor data, and retaining the collected source data;
mapping the collected source data onto a prescribed spatiotemporal model comprising a plurality of sections based on a position and time point included in the source data;
calculating a degree of impact on each of the constructs on the basis of the time point, position in the spatiotemporal model of the source data corresponding to the construct and state of the construct;
extracting and managing a relationship between the pieces of collected source data;
acquiring the prescribed data corresponding to the input data on the basis of the mapping information on the prescribed spatiotemporal model of the collected source data and the extracted relationship;
outputting a processing result of information related to state of the construct, management of an activity on the construct, and at least an impact or risk on another construct or another action by the state of the construct and the management of activity, processed on the basis of the acquired prescribed data by a prescribed data processing unit; and
acquiring at least one of a sensor arrangement state and a failure occurrence location and setting a granularity of a portion of the spatiotemporal map based on at least one of the sensor arrangement state and the failure occurrence location, wherein a number of sections in the portion of the spatiotemporal map is based on the granularity.

* * * * *